US012621319B2

(12) United States Patent
Hiruta et al.

(10) Patent No.: US 12,621,319 B2
(45) Date of Patent: May 5, 2026

(54) PROCESSING DEVICE, PROCESSING METHOD, AND NON-TRANSITORY COMPUTER-READABLE MEDIUM IN WHICH CONTROL PROGRAM IS STORED

(71) Applicant: NEC Corporation, Tokyo (JP)

(72) Inventors: Shohei Hiruta, Tokyo (JP); Satoshi Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 555 days.

(21) Appl. No.: 18/022,610

(22) PCT Filed: Aug. 27, 2020

(86) PCT No.: PCT/JP2020/032386
§ 371 (c)(1),
(2) Date: Feb. 22, 2023

(87) PCT Pub. No.: WO2022/044207
PCT Pub. Date: Mar. 3, 2022

(65) Prior Publication Data
US 2023/0362181 A1      Nov. 9, 2023

(51) Int. Cl.
*H04L 9/40*              (2022.01)
(52) U.S. Cl.
CPC ................................. *H04L 63/1425* (2013.01)
(58) Field of Classification Search
CPC ............. H04L 63/1425; H04L 63/1408; H04L 63/1416; H04L 63/1458; H04L 63/1441
See application file for complete search history.

(56) References Cited

U.S. PATENT DOCUMENTS 8,266,697 B2 * 9/2012 Coffman ................. H04L 63/14
                                                                     709/224
9,779,191 B1 * 10/2017 Hershey .................. F41H 11/02
(Continued)

FOREIGN PATENT DOCUMENTS

WO        2016/092834 A1      6/2016

OTHER PUBLICATIONS

N. Chaabouni, M. Mosbah, A. Zemmari, C. Sauvignac and P. Faruki, "Network Intrusion Detection for IoT Security Based on Learning Techniques," in IEEE Communications Surveys & Tutorials, vol. 21, No. 3, pp. 2671-2701, thirdquarter 2019. (Year: 2019).*

(Continued)

*Primary Examiner* — Kari L Schmidt
(74) *Attorney, Agent, or Firm* — Sughrue Mion, PLLC

(57)                    ABSTRACT
A processing device acquires a value of a first kind transmission performance index and a value of a second kind transmission performance index of each of a plurality of failed attack traffics being associated with a failed attack on an apparatus in a network, and a value of the first kind transmission performance index and a value of the second kind transmission performance index of each of a plurality of successful attack traffics being associated with a successful attack; and forms first attacked distribution information including information about a plurality of areas including a failed attack area and a successful attack area based on a value of the first kind transmission performance index and a value of the second kind transmission performance index for the plurality of failed attack traffics and the plurality of successful attack traffics.

12 Claims, 25 Drawing Sheets

(56) References Cited

U.S. PATENT DOCUMENTS

| | | | | |
|---|---|---|---|---|
| 11,936,663 | B2 * | 3/2024 | Yadav | H04L 63/1408 |
| 2004/0193943 | A1 * | 9/2004 | Angelino | H04L 41/0631 |
| | | | | 714/4.1 |
| 2005/0198527 | A1 * | 9/2005 | Johnson | G06F 21/577 |
| | | | | 726/22 |
| 2005/0216955 | A1 * | 9/2005 | Wilkins | H04L 63/1408 |
| | | | | 726/23 |
| 2006/0140127 | A1 * | 6/2006 | Lee | H04L 43/18 |
| | | | | 370/389 |
| 2007/0189273 | A1 * | 8/2007 | Willebeek-Lemair | |
| | | | | H04L 63/0209 |
| | | | | 370/352 |
| 2012/0227108 | A1 * | 9/2012 | Noel | H04L 63/1425 |
| | | | | 726/23 |
| 2015/0007314 | A1 | 1/2015 | Vaughan | |
| 2016/0004580 | A1 * | 1/2016 | Momot | G06F 11/0721 |
| | | | | 714/47.3 |
| 2016/0255115 | A1 * | 9/2016 | Mital | H04L 63/20 |
| | | | | 726/1 |
| 2018/0248893 | A1 * | 8/2018 | Israel | H04L 63/1433 |
| 2020/0213334 | A1 * | 7/2020 | Kutner | H04L 63/1416 |
| 2020/0267178 | A1 * | 8/2020 | Maor | H04L 63/1425 |
| 2021/0064749 | A1 * | 3/2021 | Weizman | G06F 21/561 |
| 2021/0185084 | A1 * | 6/2021 | Sodja | H04L 63/20 |
| 2021/0336938 | A1 * | 10/2021 | Karabatis | H04L 63/1475 |

OTHER PUBLICATIONS

Islam, Riadul, et al. "Graph-based intrusion detection system for controller area networks." IEEE Transactions on Intelligent Transportation Systems 23.3 (2020): 1727-1736. (Year: 2020).*

Mansmann, Florian, et al. "Visual support for analyzing network traffic and intrusion detection events using TreeMap and graph representations." Proceedings of the Symposium on Computer Human Interaction for the Management of Information Technology. 2009, pp. 19-28. (Year: 2009).*

H. Sadreazami, A. Mohammadi, A. Asif and K. N. Plataniotis, "Distributed-Graph-Based Statistical Approach for Intrusion Detection in Cyber-Physical Systems," in IEEE Transactions on Signal and Information Processing over Networks, vol. 4, No. 1, pp. 137-147, Mar. 2018. (Year: 2018).*

International Search Report for PCT Application No. PCT/JP2020/032386, mailed on Dec. 1, 2020.

Yousuke Inagaki et al., "NIDS for eliminating false positive and detecting unknown Dos attacks", vol. 2003 no. 126, IPSJ SIG Technical Reports, Dec. 19, 2003.

Daiju Sasaki et al., A Study of DOS Attack Detection Method Based on the Packet Arrival Rate, Lecture Proceedings 2 of the 2005 communication society conference of IEICE, Sep. 7, 2005.

Jumpei Urakawa et al., "Trend Analysis of DDOS Attacks in Japan", Abstracts of 2017 Symposium on Cryptography and Information Security, 2017.

* cited by examiner

| SID | Dst IP | Dst Port | Record 1 | Record 2 |
|-----|--------|----------|----------|----------|
| SID 1 | IP Address X | Port x | Record 11 | Record 21 |
| SID 1 | IP Address X | Port x | Record 12 | Record 22 |
| SID 1 | IP Address X | Port x | ... | ... |
| SID 1 | IP Address X | Port x | Record 1n | Record 2n |
| SID 1 | IP Address X | Port y | Record 11 | Record 21 |
| SID 1 | IP Address X | Port y | ... | ... |
| SID 1 | IP Address Y | Port x | Record 11 | Record 21 |
| SID 1 | IP Address Y | Port x | ... | ... |
| SID 2 | IP Address X | Port x | Record 11 | Record 21 |

Fig. 3

| SID | Dst IP | Dst Port | Record 1 | Record 2 |
|-----|--------|----------|----------|----------|
| SID 1 | IP Address X | Port x | Record 11 | Record 21 |
| SID 1 | IP Address X | Port x | Record 12 | Record 22 |
| SID 1 | IP Address X | Port x | ... | ... |
| SID 1 | IP Address X | Port x | Record 1m | Record 2m |
| SID 1 | IP Address X | Port y | Record 11 | Record 21 |
| SID 1 | IP Address X | Port y | ... | ... |
| SID 1 | IP Address Y | Port x | Record 11 | Record 21 |
| SID 1 | IP Address Y | Port x | ... | ... |
| SID 2 | IP Address X | Port x | Record 11 | Record 21 |

Fig. 4

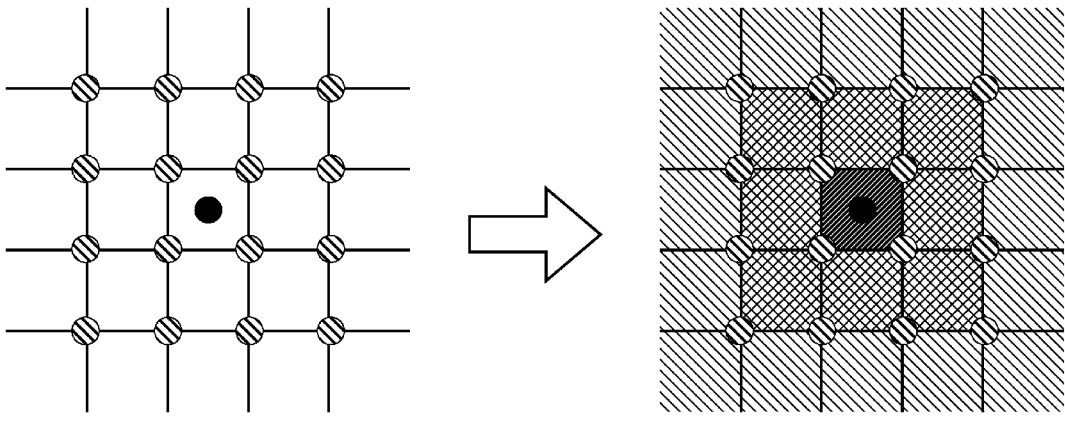

● RECORD

◎ LATTICE POINT

Fig. 5

| SID | Dst IP | Dst Port | Grid 1 | Grid2 | Area |
|---|---|---|---|---|---|
| SID 1 | IP Address X | Port x | Grid 11 | Grid 21 | Safe |
| SID 1 | IP Address X | Port x | Grid 11 | Grid 22 | Safe |
| SID 1 | IP Address X | Port x | ... | ... | ... |
| SID 1 | IP Address X | Port x | Grid 12 | Grid 21 | Unknown |
| SID 1 | IP Address X | Port x | ... | ... | ... |
| SID 1 | IP Address X | Port x | Grid 15 | Grid 28 | Critical |
| SID 1 | IP Address X | Port x | Grid 15 | Grid 29 | Critical |
| SID 1 | IP Address X | Port x | ... | ... | ... |
| SID 1 | IP Address X | Port x | Grid nn | Grid nn | Safe |
| SID 1 | IP Address X | Port y | Grid 11 | Grid 21 | Safe |

Fig. 6

| SID | Src IP | Dst IP | Src Port | Dst Port | Time |
|---|---|---|---|---|---|
| SID 1 | IP address A | IP Address X | Port a | Port x | 2020/06/04 09:00:00 |
| SID 2 | IP address B | IP Address Y | Port b | Port x | 2020/06/04 09:00:00 |
| SID 3 | IP address C | IP address Z | Port c | Port x | 2020/06/04 09:00:01 |

Fig. 10

| Src IP | Dst IP | Src Port | Dst Port | Time | Bytes Sent | Bytes Received | Duration |
|---|---|---|---|---|---|---|---|
| IP Address A | IP Address X | Port a | Port x | 2020/06/04 09:00:00 | Sent 1 | Received 1 | Duration 1 |
| IP Address B | IP Address Y | Port b | Port x | 2020/06/04 09:00:00 | Sent 2 | Received 2 | Duration 2 |
| IP Address C | IP Address Z | Port c | Port x | 2020/06/04 09:00:01 | Sent 3 | Received 3 | Duration 3 |
| IP Address D | IP Address X | Port d | Port y | 2020/06/04 09:00:01 | Sent 4 | Received 4 | Duration 4 |
| IP Address A | IP Address X | Port b | Port x | 2020/06/05 09:00:01 | Sent 5 | Received 5 | Duration 5 |

Fig. 11

```
ALERT INFORMATION
    1. ...
    2. ...
    ...
    m. ...
TRAFFIC INFORMATION
    1. ...            □
    2. ...            ☑
    ...
    n. ...            □
```

Fig. 17

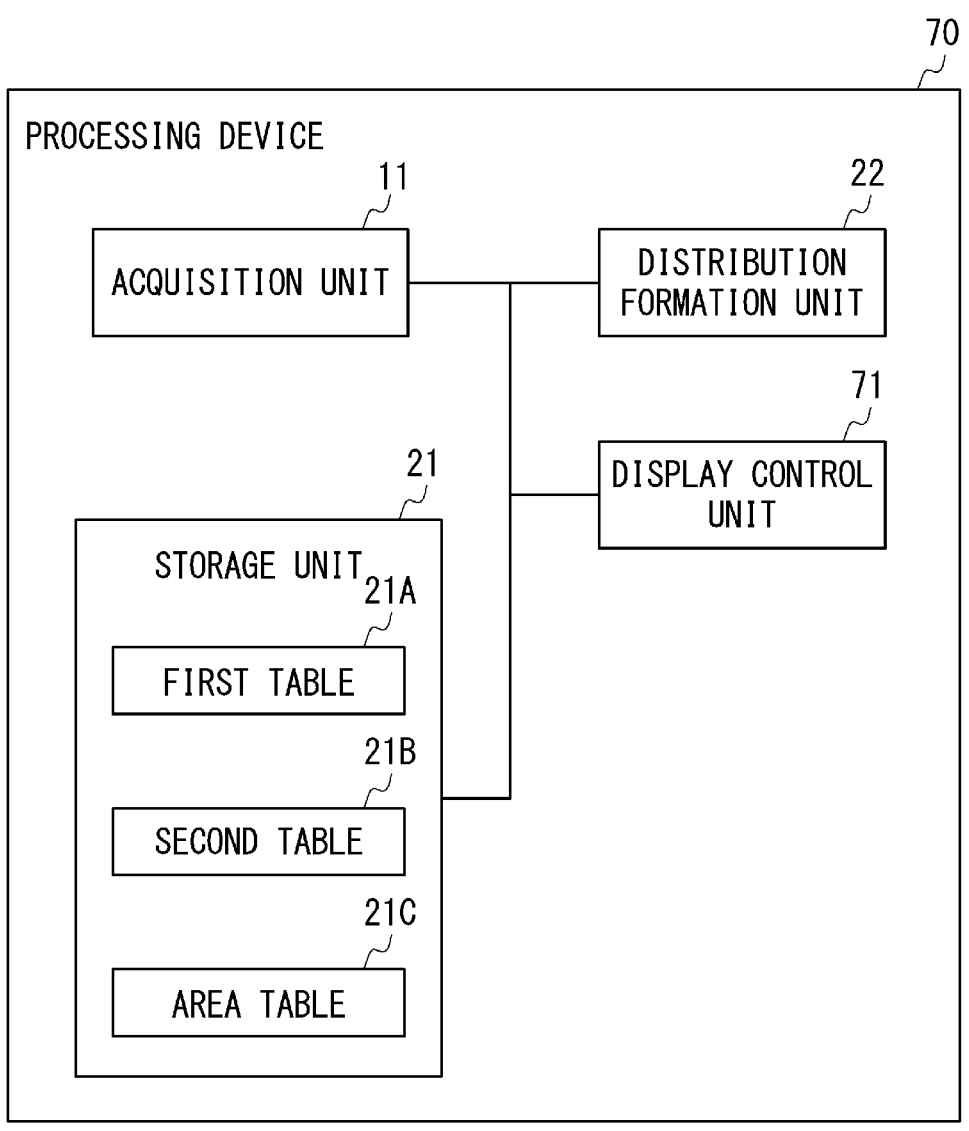
F i g.  18

100

PROCESSING DEVICE, PROCESSING METHOD, AND NON-TRANSITORY COMPUTER-READABLE MEDIUM IN WHICH CONTROL PROGRAM IS STORED

This application is a National Stage Entry of PCT/JP2020/032386 filed on Aug. 27, 2020, the contents of all of which are incorporated herein by reference, in their entirety.

TECHNICAL FIELD

The present disclosure relates to a processing device, a processing method, and a non-transitory computer-readable medium storing a control program.

BACKGROUND ART

Many organizations including a company and the like compose a security operation center (SOC) or use an external SOC service in order to protect important information of an organization from a cyber attack. The SOC is an organization that analyzes a log being generated by an information security apparatus, a server, and the like, and detects and notifies a cyber attack.

One of information security apparatuses being used in the SOC is a network-based intrusion detection system (IDS). The network-based intrusion detection system is a device that detects an attack on an apparatus present on a network and issues a security alert to an analyzer. The analyzer takes measures in such a way as to disconnect an attacked apparatus from a network, based on the security alert.

As a related technique, a device that presents alert information and importance of the alert information to an analyzer has been proposed (for example, Patent Literature 1).

CITATION LIST

Patent Literature

[Patent Literature 1] International Patent Publication No. WO2016/092834

SUMMARY OF INVENTION

Technical Problem

The present inventor has found out that only alert information and importance of the alert information being presented by the device disclosed in Patent Literature 1 may be insufficient as information to be used for an analysis of an attack.

An object of the present disclosure is to provide a processing device, a processing method, and a non-transitory computer-readable medium storing a control program that are able to form useful information for an analysis of an attack on a network apparatus.

Solution to Problem

A processing device according to a first aspect includes:
  a first acquisition means for acquiring a value of a first kind transmission performance index and a value of a second kind transmission performance index of each of a plurality of failed attack traffics being associated with a failed attack on an apparatus in a network, and a value of the first kind transmission performance index and a value of the second kind transmission performance index of each of a plurality of successful attack traffics being associated with a successful attack; and
  a distribution formation means for forming first attacked distribution information including information about a plurality of areas including a failed attack area and a successful attack area in a coordinate plane with the first kind transmission performance index and the second kind transmission performance index as two coordinate axes, based on a value of the first kind transmission performance index and a value of the second kind transmission performance index of the plurality of failed attack traffics, and a value of the first kind transmission performance index and a value of the second kind transmission performance index of the plurality of successful attack traffics.

A processing device according to a second aspect includes:
  an acquisition means for acquiring transmission performance of a plurality of first traffic flows related to a first security alert being notified from a network-based intrusion detection device configured to detect an attack on an apparatus in a network;
  a distribution formation means for calculating a value of a first kind transmission performance index and a value of a second kind transmission performance index of each first traffic flow, based on the acquired transmission performance of the plurality of first traffic flows, and forming second attacked distribution information including information about a confirmed attack area that is an area in a coordinate plane with the first kind transmission performance index and the second kind transmission performance index as two coordinate axes and is related to the first security alert, based on a calculated value of the first kind transmission performance index and a calculated value of the second kind transmission performance index of each first traffic flow; and
  a priority degree determination means for determining a priority degree of the first security alert, based on the second attacked distribution information, and first attacked distribution information including information about a plurality of areas including a failed attack area and a successful attack area in the coordinate plane.

A processing method according to a third aspect includes:
  acquiring a value of a first kind transmission performance index and a value of a second kind transmission performance index of each of a plurality of failed attack traffics being associated with a failed attack on an apparatus in a network, and a value of the first kind transmission performance index and a value of the second kind transmission performance index of each of a plurality of successful attack traffics being associated with a successful attack; and
  forming first attacked distribution information including information about a plurality of areas including a failed attack area and a successful attack area in a coordinate plane with the first kind transmission performance index and the second kind transmission performance index as two coordinate axes, based on a value of the first kind transmission performance index and a value of the second kind transmission performance index of the plurality of failed attack traffics, and a value of the first kind transmission performance index and a value of the second kind transmission performance index of the plurality of successful attack traffics.

A non-transitory computer-readable medium according to a fourth aspect stores a control program causing a processing device to execute processing of:

acquiring a value of a first kind transmission performance index and a value of a second kind transmission performance index of each of a plurality of failed attack traffics being associated with a failed attack on an apparatus in a network, and a value of the first kind transmission performance index and a value of the second kind transmission performance index of each of a plurality of successful attack traffics being associated with a successful attack; and forming first attacked distribution information including information about a plurality of areas including a failed attack area and a successful attack area in a coordinate plane with the first kind transmission performance index and the second kind transmission performance index as two coordinate axes, based on a value of the first kind transmission performance index and a value of the second kind transmission performance index of the plurality of failed attack traffics, and a value of the first kind transmission performance index and a value of the second kind transmission performance index of the plurality of successful attack traffics.

Advantageous Effects of Invention

The present disclosure is able to provide a processing device, a processing method, and a non-transitory computer-readable medium storing a control program that are able to form useful information for an analysis of an attack on a network apparatus.

BRIEF DESCRIPTION OF DRAWINGS

FIG. 3 is a diagram illustrating one example of a first table;

FIG. 4 is a diagram illustrating one example of a second table;

FIG. 5 is a diagram for describing generation of a probability density distribution;

FIG. 6 is a diagram illustrating one example of an area table;

FIG. 10 is a diagram illustrating one example of an alert information table;

FIG. 11 is a diagram illustrating one example of a traffic information table;

FIG. 17 is a diagram illustrating one example of a display;

FIG. 18 is a block diagram illustrating one example of a processing device according to a fifth example embodiment;

EXAMPLE EMBODIMENT

Example embodiments will be described below with reference to the drawings. Note that an identical or similar element is provided with an identical reference sign, and overlapping description is omitted.

First Example Embodiment

Figure 1:
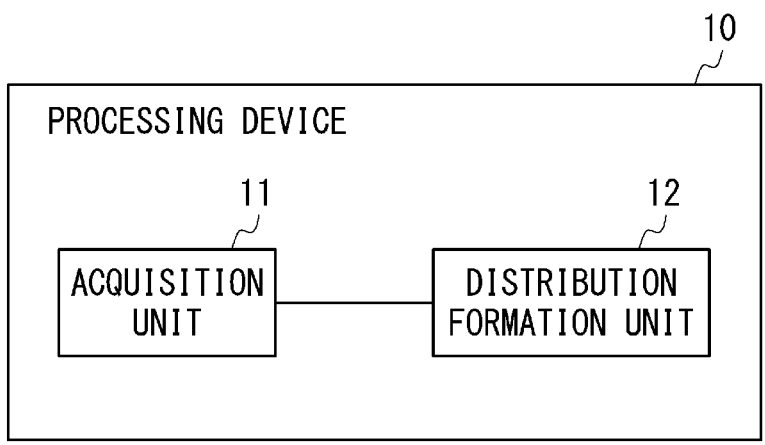
FIG. 1 is a block diagram illustrating one example of a processing device according to a first example embodiment.

FIG. 1 is a block diagram illustrating one example of a processing device according to a first example embodiment. In FIG. 1, a processing device 10 includes an acquisition unit (first acquisition unit) 11 and a distribution formation unit 12.

The acquisition unit 11 acquires a value of a first kind transmission performance index and a value of a second kind transmission performance index of each of a plurality of traffics (hereinafter, may be referred to as "failed attack traffics") associated with a failed attack on an apparatus (not illustrated) in a network. Further, the acquisition unit 11 acquires a value of the first kind transmission performance index and a value of the second kind transmission performance index of each of a plurality of traffics (hereinafter, may be referred to as "successful attack traffics") associated with a successful attack on an apparatus (not illustrated) in a network. The first kind transmission performance index may be, for example, a logarithm (a common logarithm or a natural logarithm) of a transmission byte size per unit time for a traffic. Further, the second kind transmission performance index may be a logarithm (a common logarithm or a natural logarithm) of a received byte size per unit time for a traffic.

The distribution formation unit 12 forms "first attacked distribution information", based on the above-described information being acquired by the acquisition unit 11. The "first attacked distribution information" includes information about a plurality of areas including a "failed attack area (safe area)" and a "successful attack area (critical area)" in a coordinate plane with the first kind transmission performance index and the second kind transmission performance index as two coordinate axes. The "failed attack area" is an area in the coordinate plane described above, and is an area being associated with traffic transmission performance in which an attack fails or is likely to fail. The "successful attack area" is an area in the coordinate plane described above, and is an area being associated with traffic transmission performance in which an attack succeeds or is likely to succeed.

With the configuration of the processing device described above, the "first attacked distribution information" can be formed. As described above, the "first attacked distribution information" includes information about the "failed attack area" and the "successful attack area" in the coordinate plane with the first kind transmission performance index and the second kind transmission performance index as two coordinate axes. The information about the "failed attack area" and the "successful attack area" in the coordinate plane described above is useful information for analyzing a tendency of success or failure of an attack. In other words, with the configuration of the processing device 10 described above, useful information for an analysis of an attack on a network apparatus can be formed.

Note that the processing device 10 described above executes a processing method including: acquiring a value of a first kind transmission performance index and a value of a second kind transmission performance index of each of a plurality of failed attack traffics being associated with a failed attack on an apparatus in a network, and a value of the first kind transmission performance index and a value of the second kind transmission performance index of each of a plurality of successful attack traffics being associated with a successful attack; and forming first attacked distribution information including information about a plurality of areas including a failed attack area and a successful attack area in a coordinate plane with the first kind transmission performance index and the second kind transmission performance index as two coordinate axes, based on a value of the first kind transmission performance index and a value of the second kind transmission performance index of the plurality of failed attack traffics and a value of the first kind transmission performance index and a value of the second kind transmission performance index of the plurality of successful attack traffics.

Further, in the description above, two parameters of the first kind transmission performance index and the second kind transmission performance index are focused, but the present disclosure is not limited thereto. In other words, the "first attacked distribution information" may include information about a plurality of spaces including a "failed attack space (safe space)" and a "successful attack space (critical space)" in a coordinate space defined by a plurality of coordinate axes being associated with three or more parameters including the first kind transmission performance index and the second kind transmission performance index. Also, in this case, the "first attacked distribution information" includes information about a plurality of areas including a "failed attack area (safe area)" and a "successful attack area (critical area)" in a coordinate plane with the first kind transmission performance index and the second kind transmission performance index as two coordinate axes.

Second Example Embodiment

A second example embodiment relates to one example of a specific formation method of "first attacked distribution information".

Configuration Example of Processing Device

Figure 2:
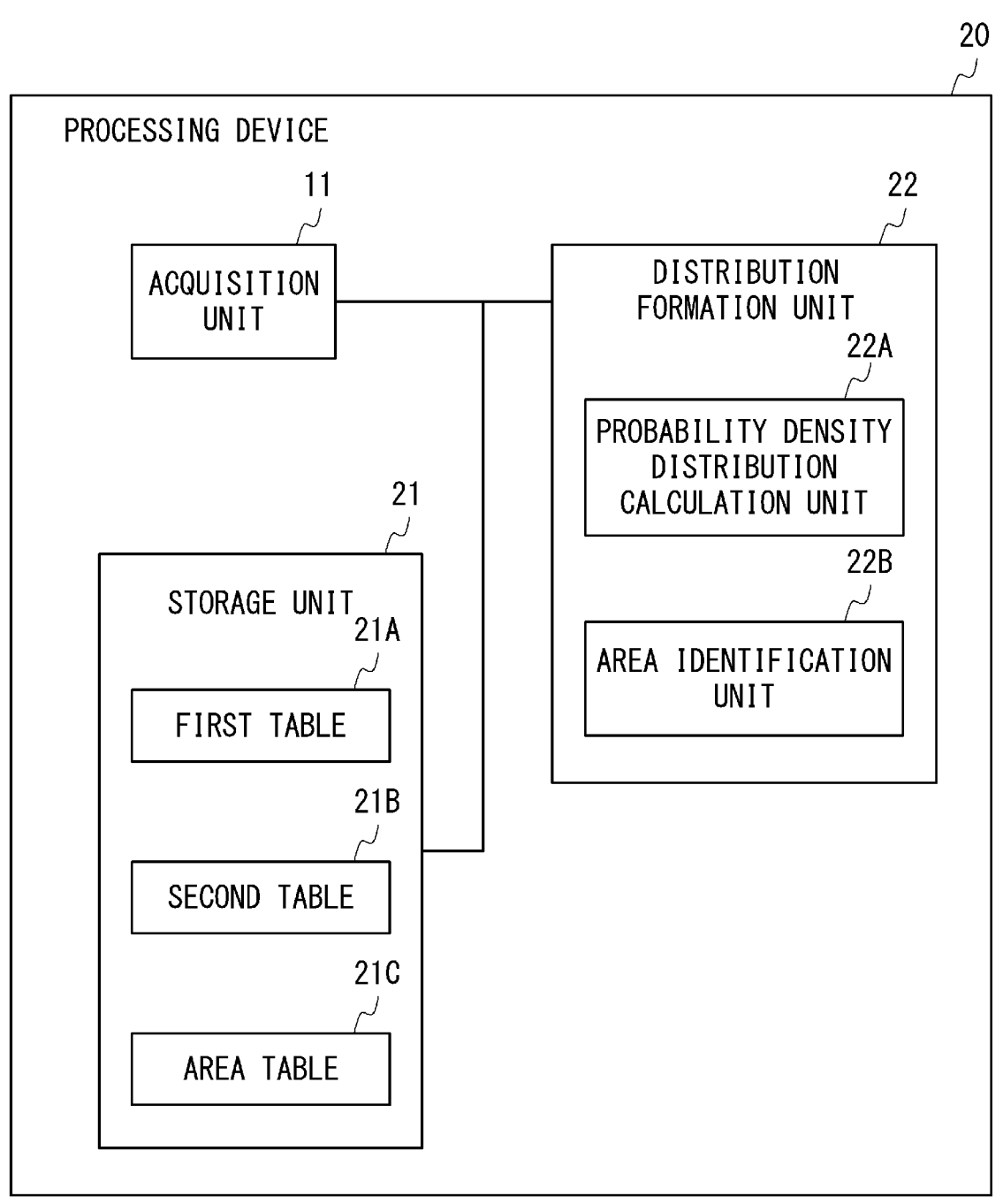
FIG. 2 is a block diagram illustrating one example of a processing device according to a second example embodiment.

FIG. 2 is a block diagram illustrating one example of a processing device according to the second example embodiment. In FIG. 2, a processing device 20 includes an acquisition unit 11, a storage unit 21, and a distribution formation unit 22. Note that, herein, the storage unit 21 is assumed to be included in the processing device 20 in the description, but the present example embodiment is not limited thereto, and the storage unit 21 may be formed as a device separated from the processing device 20 and connected to the processing device 20.

The storage unit 21 stores a first table (distribution formation record table) 21A and a second table (critical area generation record table) 21B.

FIG. 3 is a diagram illustrating one example of the first table. FIG. 4 is a diagram illustrating one example of the second table. The first table 21A is associated with a failed attack traffic, and the second table 21B is associated with a successful attack traffic.

As illustrated in FIG. 3, a plurality of entries (a plurality of information units) of the first table 21A are each associated with a failed attack traffic. Each of the entries is held in a state where a signature ID (SID) of a security alert related to an associated failed attack traffic, a destination IP address (Dst IP), a destination port number (Dst Port), a value (Record 1) of a first kind transmission performance index, and a value (Record 2) of a second kind transmission performance index being related to the associated failed attack traffic are associated with one another.

As illustrated in FIG. 4, a plurality of entries (a plurality of information units) of the second table 21B are each associated with a successful attack traffic. Each of the entries is held in a state where a signature ID (SID) of a security alert related to an associated successful attack traffic, a destination IP address (Dst IP), a destination port number (Dst Port), a value (Record 1) of the first kind transmission performance index, and a value (Record 2) of the second kind transmission performance index being related to the associated successful attack traffic are associated with one another.

The acquisition unit 11 acquires, from the first table 21A, a plurality of entries associated with a combination (i.e., a combination of a signature ID, a destination IP address, and a destination port number) being an acquisition target. Further, the acquisition unit 11 acquires a plurality of entries associated with the combination being the acquisition target described above from the second table 21B. In other words, the acquisition unit 11 acquires, as one acquisition unit, a plurality of entries common to a combination of a signature ID, a destination IP address, and a destination port number. Note that a destination IP address and a destination port number can be collectively referred to as "destination information".

Similarly to the distribution formation unit 12 according to the first example embodiment, the distribution formation unit 22 forms "first attacked distribution information", based on the above-described information being acquired by the acquisition unit 11. As described above, since the acquisition unit 11 acquires, as one acquisition unit, a plurality of entries common to a combination of a signature ID, a destination IP address, and a destination port number, the distribution formation unit 22 forms the "first attacked distribution information" for the combination of the signature ID, the destination IP address, and the destination port number.

For example, the distribution formation unit 22 includes a probability density distribution calculation unit 22A and an area identification unit 22B.

The probability density distribution calculation unit 22A calculates a distribution of a "failed attack probability density" in the coordinate plane described above for a plurality of failed attack traffics, based on a value of the first kind transmission performance index and a value of the second kind transmission performance index of the failed attack traffics. Further, the probability density distribution calculation unit 22A calculates a distribution of a "successful attack probability density" in the coordinate plane described above for a plurality of successful attack traffics, based on a value of the first kind transmission performance index and a value of the second kind transmission performance index of the successful attack traffics.

Kernel density estimation (KDE) can be used for calculation of a probability density. In other words, for example, a failed attack probability density f(x) can be calculated by using an equation (1) below. Note that a successful attack probability density $f_{cri}(x)$ can also be similarly calculated.

[Mathematical 1]

$$\hat{f}(x) = \frac{1}{nh^d} \sum_{i=1}^{n} K\left(\frac{x - x_i}{h}\right) \quad (1)$$

Herein, in the equation (1), $x_i$ is a d-dimensional performance index of a failed attack traffic, n is an element number of the failed attack traffic, h is a bandwidth, and K is a kernel function.

FIG. 5 is a diagram for describing generation of a probability density distribution. First, a set grid of lattice points in the coordinate plane described above is defined as in the following equation (2), for example. In other words, a lattice point is defined at 0.025 intervals from 0 to 1 for each of two axes defining the coordinate plane described above. Hereinafter, a rectangular area of 0.025 0.025 with each lattice point at the center may be referred to as a "unit area". Note that, herein, a rectangular area of 0.025×0.025 with each lattice point at the center is a "unit area", which is not limited thereto, and an area surrounded by four adjacent lattice points may be a "unit area".

[Mathematical 2]

$$grid=[0.0{:}1.025{:}0.025,0.0{:}1.025{:}0.025] \quad (2)$$

As illustrated in a right diagram in FIG. 5, when a point associated with a value of the first kind transmission performance index and a value of the second kind transmission performance index of a certain failed attack traffic is present in one unit area, a probability density of the one unit area is the highest and a probability density farther from the one unit area decreases in a distribution to be generated. Note that a probability density distribution as in the right diagram in FIG. 5 can be acquired by substituting the value of the first kind transmission performance index and the value of the second kind transmission performance index of the certain failed attack traffic for $x_i$ in the equation (1) and substituting each lattice point of a set of lattice points defined in the equation (2) for x in the equation (1).

The area identification unit 22B assigns each unit area in the coordinate plane described above to any of a failed attack area (safe area), a successful attack area (critical area), and an unconfirmed attack area (unknown area), based on magnitude between each of a failed attack probability density and a successful attack probability density of each unit area and an area determination threshold value $Th_{area}$. Then, the area identification unit 22B forms "first attacked distribution information" by associating each unit area with an area classification (area label) being assigned to each unit area.

For example, the area identification unit 22B provides an area classification "critical area" to a lattice point that satisfies $f_{cri}(x) > Th_{area}$ for each lattice point in the coordinate plane described above. Further, the area identification unit 22B provides an area classification "safe area" to a lattice point that satisfies $f(x) > Th_{area}$ for each lattice point in the coordinate plane described above. Herein, the area identification unit 22B may provide the area classification "critical area" to a lattice point that satisfies both of $f_{cri}(x) > Th_{area}$ and $f(x) > Th_{area}$. Further, the area identification unit 22B provides an area classification "unknown area" to a lattice point that satisfies both of $f_{cri}(x) \leq Th_{area}$ and $f(x) \leq Th_{area}$.

The area identification unit 22B stores the "first attacked distribution information (area table 21C)" in the storage unit 21 by outputting the formed "first attacked distribution information" to the storage unit 21.

FIG. 6 is a diagram illustrating one example of the area table. As illustrated in FIG. 6, a plurality of entries (a plurality of information units) of the area table 21C are each associated with a lattice point in the coordinate plane described above. Each of the entries is held in a state where a combination of a signature ID, a destination IP address, and a destination port number, coordinates (Grid 1, Grid 2) of the lattice point, and an area classification (Area) are associated with one another. The area table 21C is stored for each combination of a signature ID, a destination IP address, and a destination port number.

Operation Example of Processing Device

Figure 7:
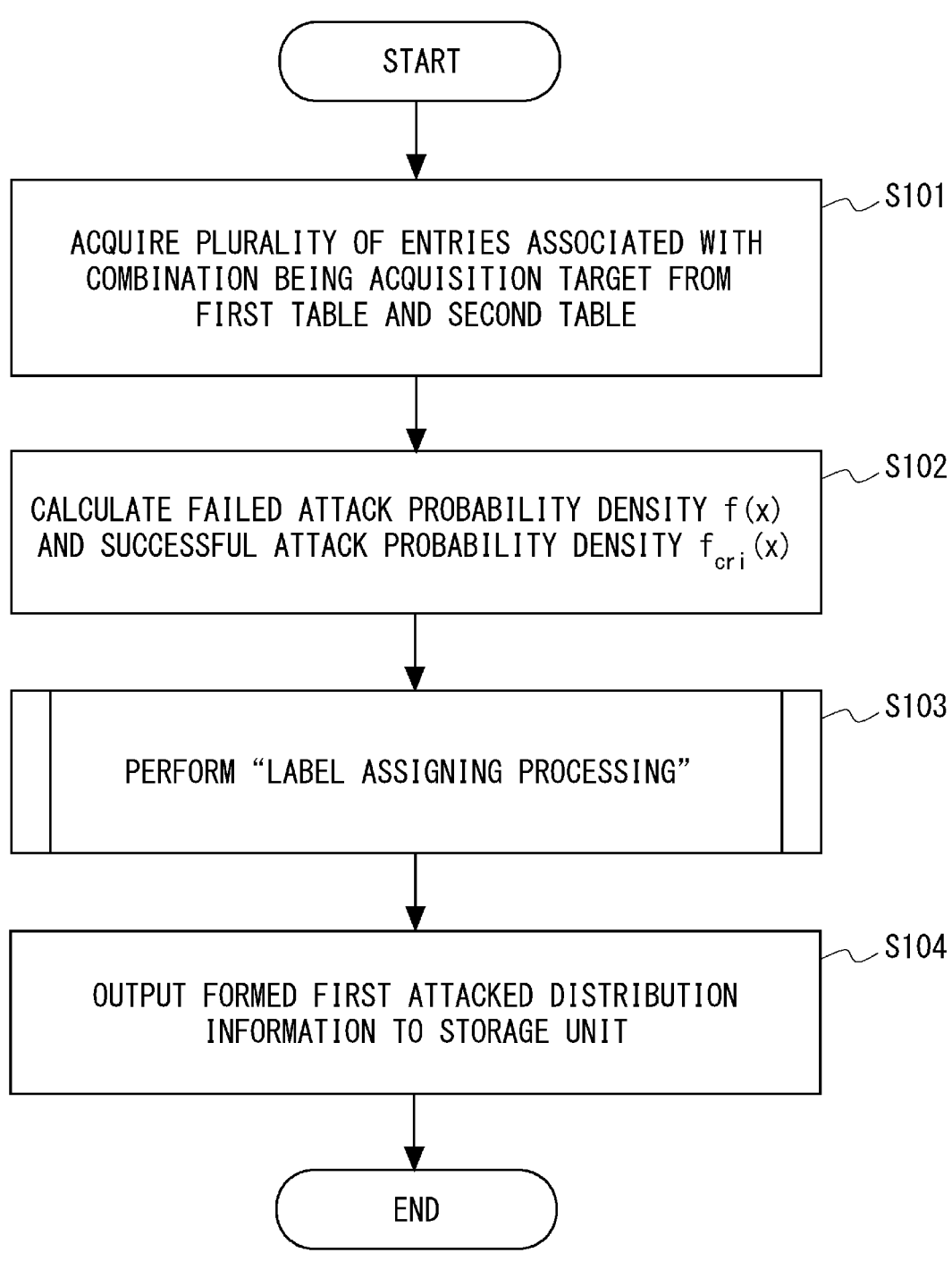
FIG. 7 is a flowchart illustrating one example of a processing operation of the processing device according to the second example embodiment.
Figure 8:
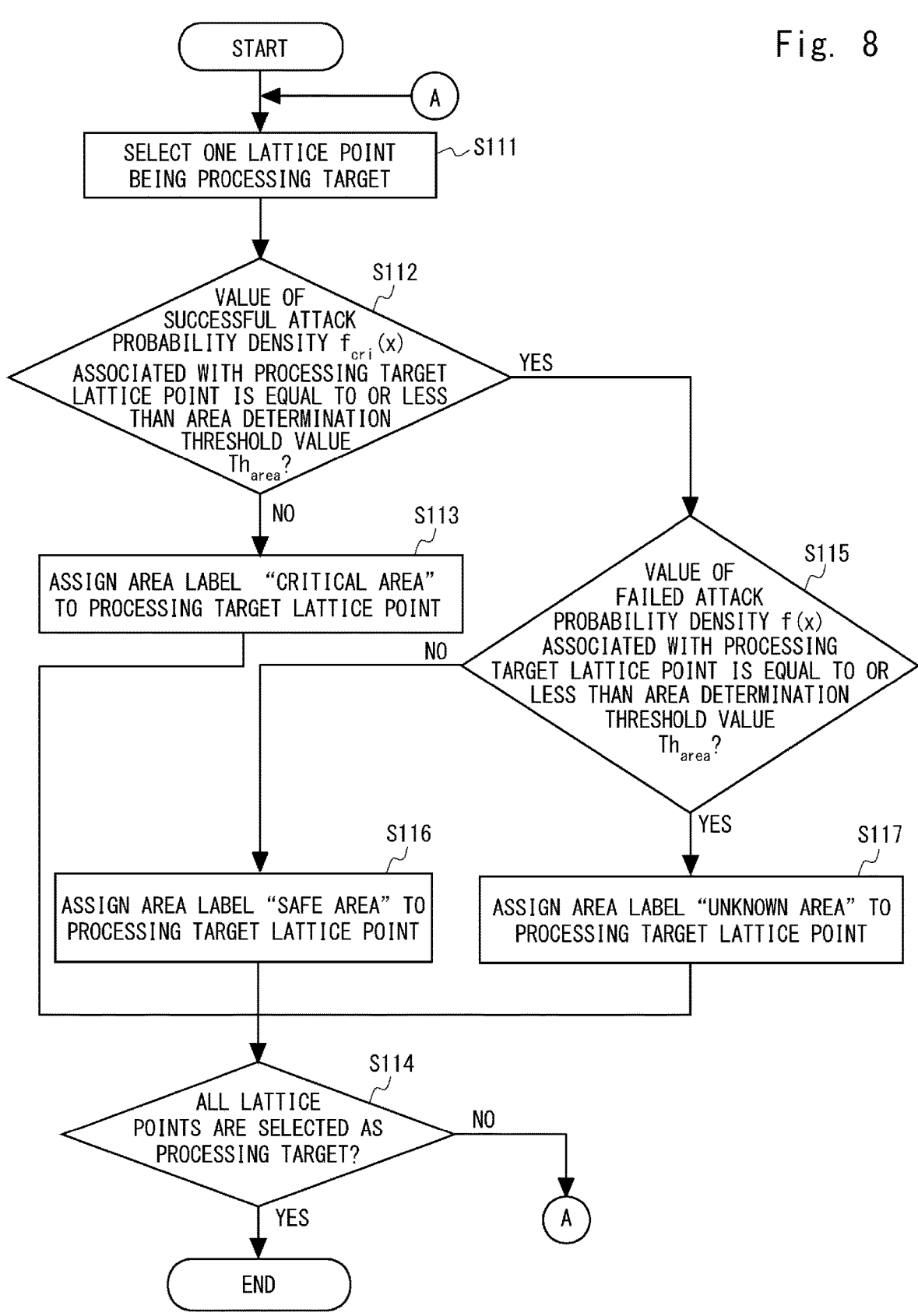
FIG. 8 is a flowchart illustrating one example of a processing operation of the processing device according to the second example embodiment.

One example of a processing operation of the processing device 20 having the configuration described above will be described. FIGS. 7 and 8 are flowcharts illustrating one example of the processing operation of the processing device according to the second example embodiment. The flowcharts in FIGS. 7 and 8 are performed for each combination of a signature ID, a destination IP address, and a destination port number.

The acquisition unit 11 acquires a plurality of entries associated with a combination being an acquisition target from a first table and a second table (step S101).

The probability density distribution calculation unit 22A calculates a failed attack probability density f(x), based on a value of a first kind transmission performance index and a value of a second kind transmission performance index of a plurality of failed attack traffics (step S102). Further, the probability density distribution calculation unit 22A calculates a successful attack probability density $f_{cri}(x)$, based on a value of the first kind transmission performance index and a value of the second kind transmission performance index of a plurality of successful attack traffics (step S102).

The area identification unit 22B performs "label assigning processing" of assigning an area label to each lattice point (i.e., each unit area) (step S103). FIG. 8 illustrates one example of the "label assigning processing".

As illustrated in FIG. 8, the area identification unit 22B selects one lattice point (i.e., unit area) being a processing target (step S111).

The area identification unit 22B determines whether a value of the successful attack probability density $f_{crt}(x)$ associated with the processing target lattice point is equal to or less than an area determination threshold value $Th_{area}$ (step S112).

When the value of the successful attack probability density $f_{crt}(x)$ associated with the processing target lattice point is greater than the area determination threshold value $Th_{area}$ (step S112: NO), the area identification unit 22B assigns an area label "critical area" to the processing target lattice point (step S113).

The area identification unit 22B determines whether all lattice points are selected as the processing target (step S114). When all lattice points are selected as the processing target (step S114: YES), the "label assigning processing" ends.

When a lattice point that is not yet selected as the processing target is present (step S114: NO), the area identification unit 22B selects, as the processing target lattice point, the lattice point that is not yet selected (step S111).

When the value of the successful attack probability density $f_{crt}(x)$ associated with the processing target lattice point is equal to or less than the area determination threshold value $Th_{area}$ (step S112: YES), the area identification unit 22B determines whether the failed attack probability density $f(x)$ associated with the processing target lattice point is equal to or less than the area determination threshold value $Th_{area}$ (step S115).

When the value of the failed attack probability density $f(x)$ associated with the processing target lattice point is greater than the area determination threshold value $Th_{area}$ (step S115: NO), the area identification unit 22B assigns an area label "safe area" to the processing target lattice point (step S116). Then, the processing step proceeds to step S114.

When the value of the failed attack probability density feri (x) f (x) associated with the processing target lattice point is equal to or less than the area determination threshold value Tharea (step S115: YES), the area identification unit 22B assigns an area label "unknown area" to the processing target lattice point (step S117). Then, the processing step proceeds to step S114.

Returning to the description in FIG. 7, the area identification unit 22B stores "first attacked distribution information (area table 21C)" in the storage unit 21 by outputting the formed "first attacked distribution information" to the storage unit 21 (step S104).

Third Example Embodiment

A third example embodiment relates to a "priority degree determination" of a security alert by using "first attacked distribution information".

Outline of System

Figure 9:
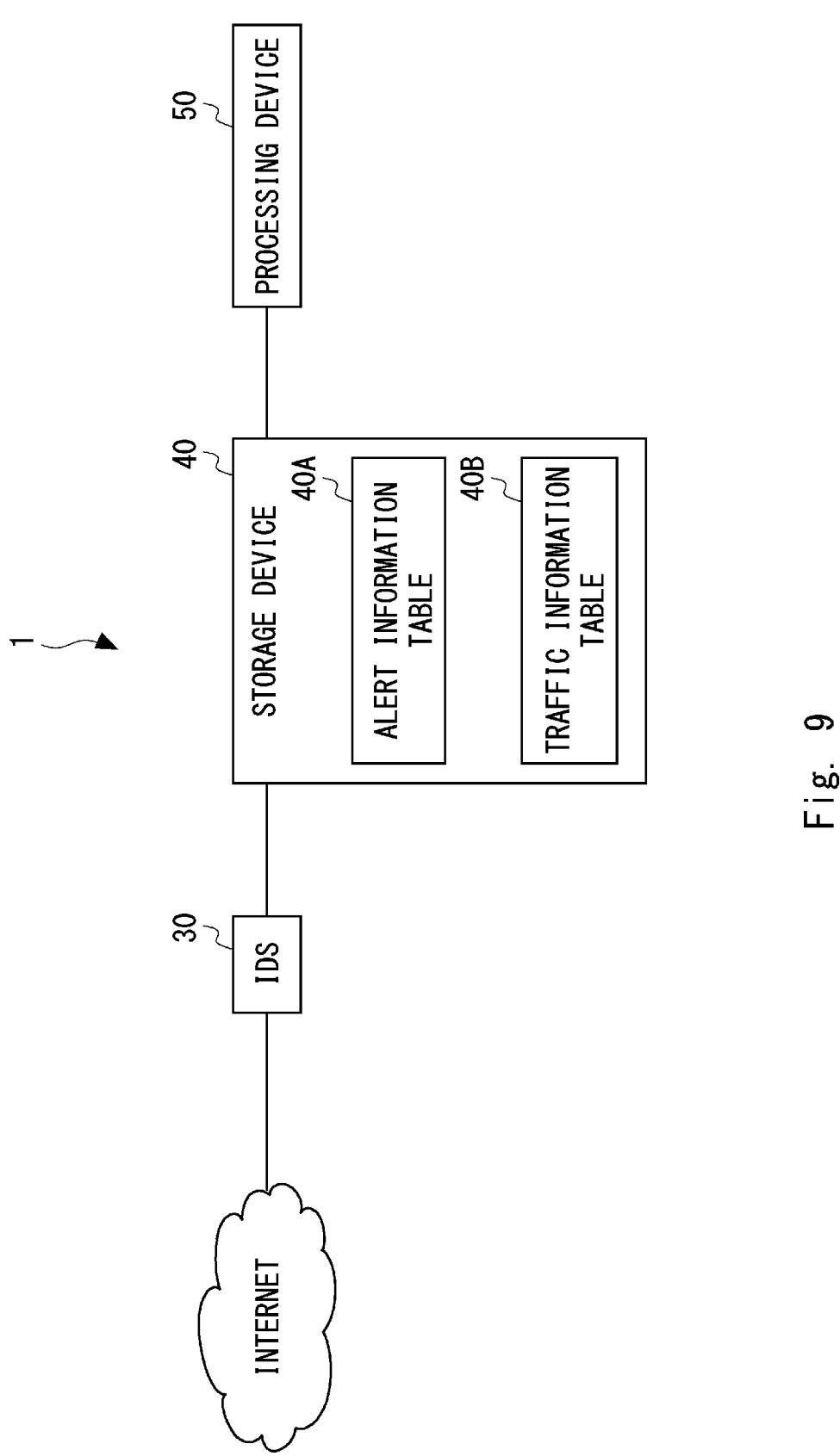
FIG. 9 is a diagram illustrating one example of a system according to a third example embodiment.

FIG. 9 is a diagram illustrating one example of a system according to the third example embodiment. A system 1 in FIG. 9 includes a network-based intrusion detection system (IDS) 30, a storage device 40, and a processing device 50.

The IDS 30 monitors a traffic flow flowing through a boundary between the Internet and an intranet, and detects an attack on an apparatus in the intranet. Then, when the attack is detected, The IDS 30 transmits, to the storage device 40, a security alert including "flow identification information" and a "detection time" of an alert target flow. The "flow identification information" is, for example, a "signature ID", "transmission source information", and "destination information" of the alert target flow. The "transmission source information" is, for example, a transmission source IP address (Src IP) and a transmission source port number (Src Port). The "destination information" is, for example, a destination IP address and a destination port number. Note that, hereinafter, the "flow identification information" and the "detection time" of the alert target flow may be collectively referred to as "alert information".

The "alert information" of the alert target flow is held, in an alert information table 40A stored in the storage device 40, as one entry of the alert information table 40A. FIG. 10 is a diagram illustrating one example of the alert information table.

Further, the IDS 30 monitors a traffic flow flowing through a boundary between the Internet and an intranet, and transmits "traffic information" of each traffic flow to the storage device 40. The "traffic information" includes, for example, "flow identification information", a "communication time", "transmission performance", and "communication time (duration)". The "flow identification information" is, for example, "transmission source information" and "destination information". The "transmission source information" is, for example, a transmission source IP address (Src IP) and a transmission source port number (Src Port). The "destination information" is, for example, a destination IP address and a destination port number. The "transmission performance" is sending performance (for example, sent bytes (bytes sent)) and receiving performance (for example, received bytes (bytes received)). Note that, herein, the IDS 30 is assumed to monitor a traffic flow and transmit traffic information in the description, but the present disclosure is not limited thereto. A device (for example, a flow monitoring device) different from the IDS 30 may be provided in the system 1, and the device may monitor a traffic flow flowing through a boundary between the Internet and an intranet, and transmit "traffic information" of each traffic flow to the storage device 40.

The "traffic information" is held, in a traffic information table 40B stored in the storage device 40, as one entry of the traffic information table 40B. FIG. 11 is a diagram illustrating one example of the traffic information table.

The storage device 40 stores the alert information table 40A and the traffic information table 40B described above.

Configuration Example of Processing Device

Figure 12:
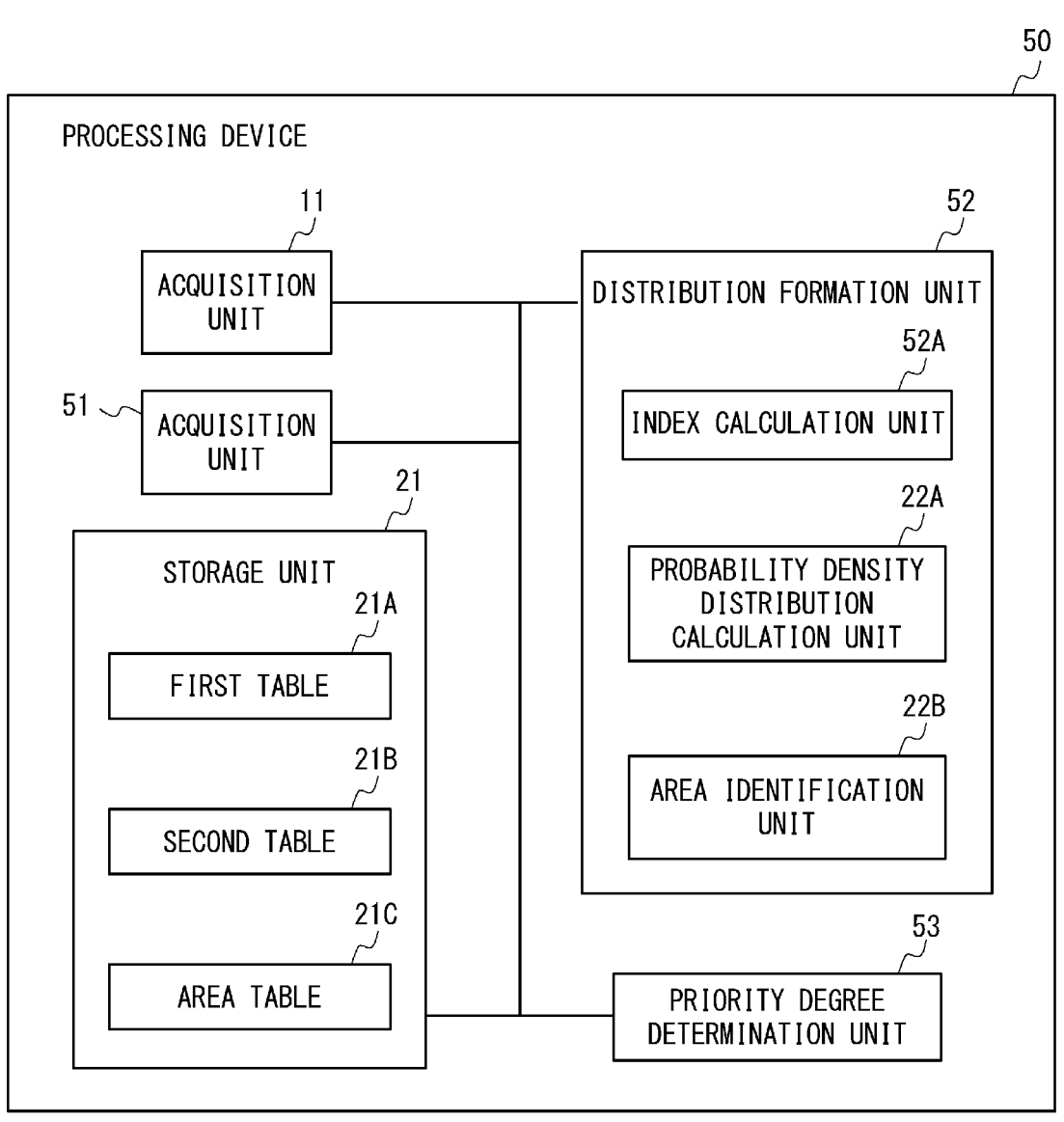
FIG. 12 is a block diagram illustrating one example of a processing device according to the third example embodiment.

FIG. 12 is a block diagram illustrating one example of the processing device according to the third example embodiment. In FIG. 12, the processing device 50 includes an acquisition unit 11, a storage unit 21, an acquisition unit (second acquisition unit) 51, a distribution formation unit 52, and a priority degree determination unit 53. Note that, herein, the acquisition unit 11 and the acquisition unit 51 are described as different components, but the present example embodiment is not limited thereto, and the acquisition unit 11 and the acquisition unit 51 may be one component.

The acquisition unit 51 acquires transmission performance of a plurality of traffic flows (hereinafter, may be referred to as "first traffic flows") related to a security alert (hereinafter, may be referred to as a "priority degree determination alert (first security alert)") being a target of a priority degree determination.

For example, the acquisition unit 51 acquires, from the alert information table 40A, an entry (i.e., an "alert information unit") being associated with the same combination as a combination of a signature ID, a transmission source IP address, a destination IP address, and a destination port number of a priority degree determination alert and being associated with a detection time in a "predetermined period (i.e., a related alert reference period)" including a detection time of the priority degree determination alert. Hereinafter, the alert information unit being acquired herein and the alert information about the priority degree determination alert may be collectively referred to as a "related alert information unit group".

Then, the acquisition unit 51 acquires, from the traffic information table 40B, an entry (i.e., a "traffic information unit") being associated with the same combination as a combination of a transmission source IP address, a destination IP address, and a destination port number of each alert information unit included in the "related alert information unit group" and being associated with a communication time in a "predetermined period (related traffic reference period)" including a detection time of each alert information unit. Hereinafter, all the traffic information units being acquired herein may be collectively referred to as a "related traffic information unit group".

Note that, as the priority degree determination alert, a security alert associated with any alert information unit held in the alert information table 40A may be selected.

Similarly to the distribution formation unit 22 according to the second example embodiment, the distribution formation unit 52 forms "first attacked distribution information".

Further, the distribution formation unit 52 calculates a value of a first kind transmission performance index and a value of a second kind transmission performance index of each of a plurality of first traffic flows, based on transmission performance of the plurality of first traffic flows being acquired by the acquisition unit 51.

Then, the distribution formation unit 52 forms "second attacked distribution information" including information about a "confirmed attack area (hit area)" related to a first security alert in the coordinate plane described above, based on the calculated value of the first kind transmission performance index and the calculated value of the second kind transmission performance index of each of the first traffic flows.

For example, the distribution formation unit 52 includes an index calculation unit 52A, a probability density distribution calculation unit 22A, and an area identification unit 22B.

The index calculation unit 52A calculates a value of the first kind transmission performance index and a value of the second kind transmission performance index of each of a plurality of first traffic flows, based on transmission performance of the plurality of first traffic flows being acquired by the acquisition unit 51. For example, the index calculation unit 52A calculates a value of the first kind transmission performance index by dividing sending performance of each traffic information unit of a related traffic information unit group by a communication duration, and calculates a value of the second kind transmission performance index by dividing receiving performance by the communication duration.

In the third example embodiment, the probability density distribution calculation unit 22A further calculates a distribution of a probability density ("confirmed attack probability density") in the coordinate plane described above for the plurality of first traffic flows, based on the value of the first kind transmission performance index and the value of the second kind transmission performance index of the first traffic flows.

In the third example embodiment, the area identification unit 22B further assigns, to a confirmed attack area (hit area), a lattice point (unit area) being a lattice point (unit area) in the coordinate plane described above and having the "confirmed attack probability density" greater than an area determination threshold value $Th_{area}$. Then, the area identification unit 22B forms the "second attacked distribution information" by associating each unit area being assigned to the confirmed attack area with an area label "hit area".

Herein, in the third example embodiment, the "first attacked distribution information" described above is related to a security alert (second security alert) notified from the IDS 30 before (in the past) the first security alert being associated with the "second attacked distribution information".

The priority degree determination unit 53 acquires, from an area table 21C, the "first attacked distribution information" associated with the same combination as a combination of a signature ID, a destination IP address, and a destination port number of a priority degree determination alert.

Then, the priority degree determination unit 53 determines a priority degree of the first security alert, based on the "first attacked distribution information" and the "second attacked distribution information" formed by the distribution formation unit 52.

For example, when at least a part of the "confirmed attack area (hit area)" indicated by the second attacked distribution information overlaps a "successful attack area (critical area)" indicated by the first attacked distribution information, the priority degree determination unit 53 assigns a "first priority degree" to the priority degree determination alert (first security alert).

Further, when the "confirmed attack area" indicated by the second attacked distribution information and the "successful attack area" indicated by the first attacked distribution information do not overlap each other, the priority degree determination unit 53 calculates a proportion (score) of a portion area of the confirmed attack area that does not overlap a failed attack area. For example, when the number of lattice points (unit areas) of the confirmed attack area is N, and the number of lattice points (unit areas) that do not overlap the failed attack area (safe area) among the lattice points (unit areas) of the confirmed attack area is $N_{safe}$, a proportion (score) S of the portion area described above is calculated by the following equation (3), for example.

[Mathematical 3]

$$S = \frac{N - N_{safe}}{N} \tag{3}$$

Then, when the calculated proportion (score) S is greater than a priority degree determination threshold value, the priority degree determination unit 53 assigns a "second priority degree" to the priority degree determination alert (first security alert). Further, when the calculated proportion (score) S is equal to or less than the priority degree determination threshold value, the priority degree determination unit 53 assigns a "third priority degree" to the priority degree determination alert (first security alert).

Herein, for example, the first priority degree has a priority degree equal to the second priority degree or higher than the second priority degree, and the third priority degree has a priority degree lower than both of the first priority degree and the second priority degree.

Operation Example of Processing Device

Figure 13:
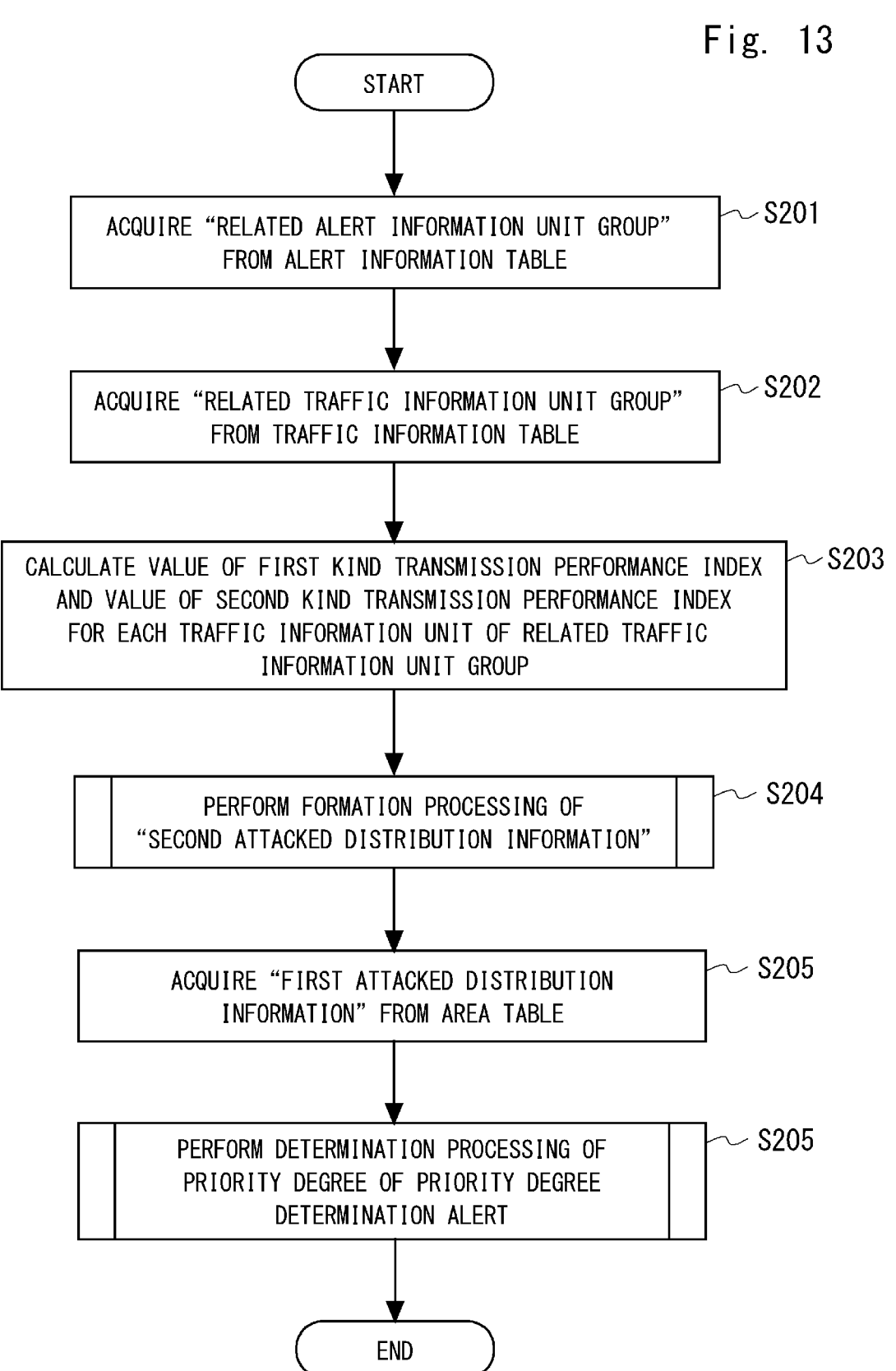
FIG. 13 is a flowchart illustrating one example of a processing operation of the processing device according to the third example embodiment.
Figure 14:
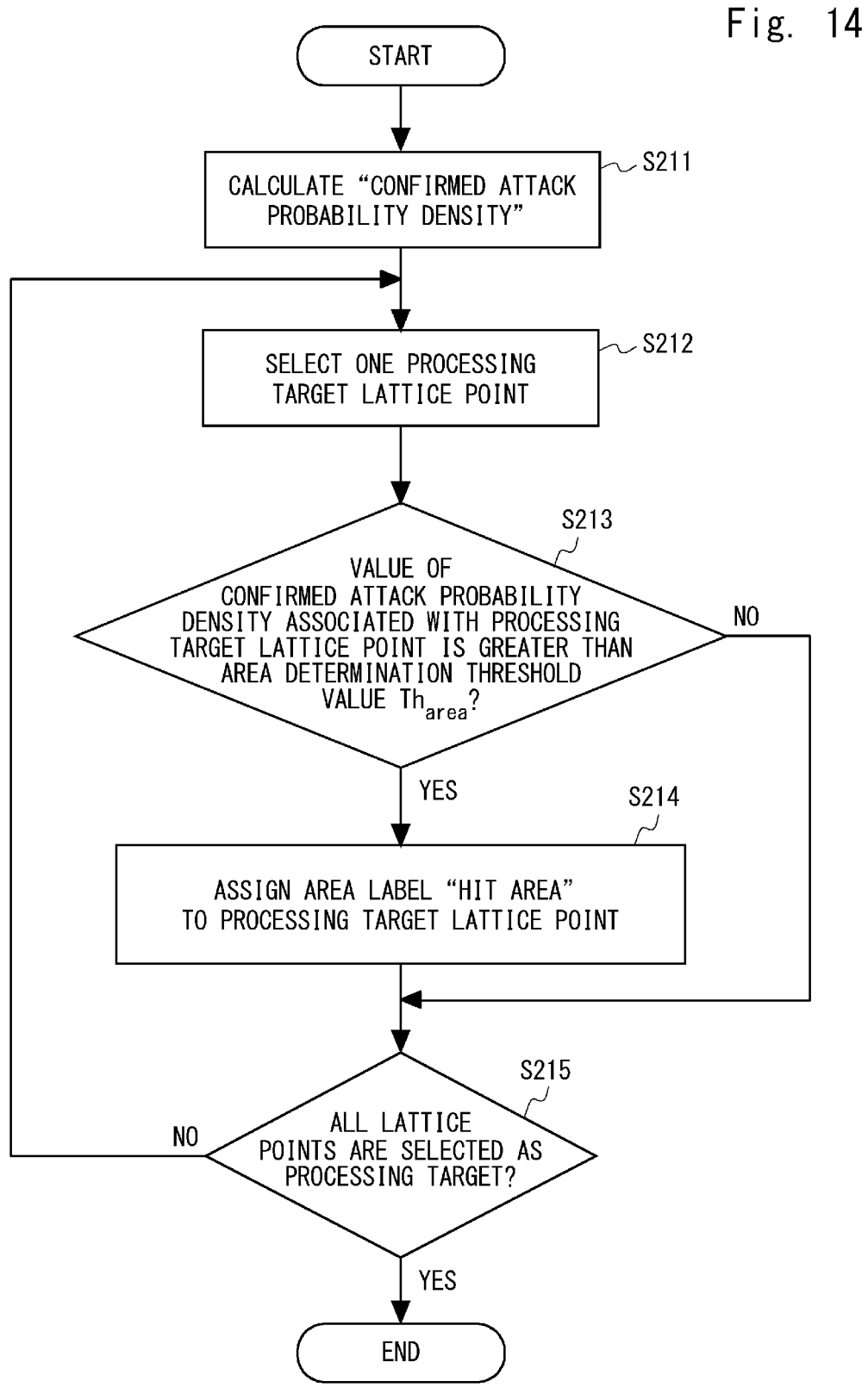
FIG. 14 is a flowchart illustrating one example of a processing operation of the processing device according to the third example embodiment.
Figure 15:
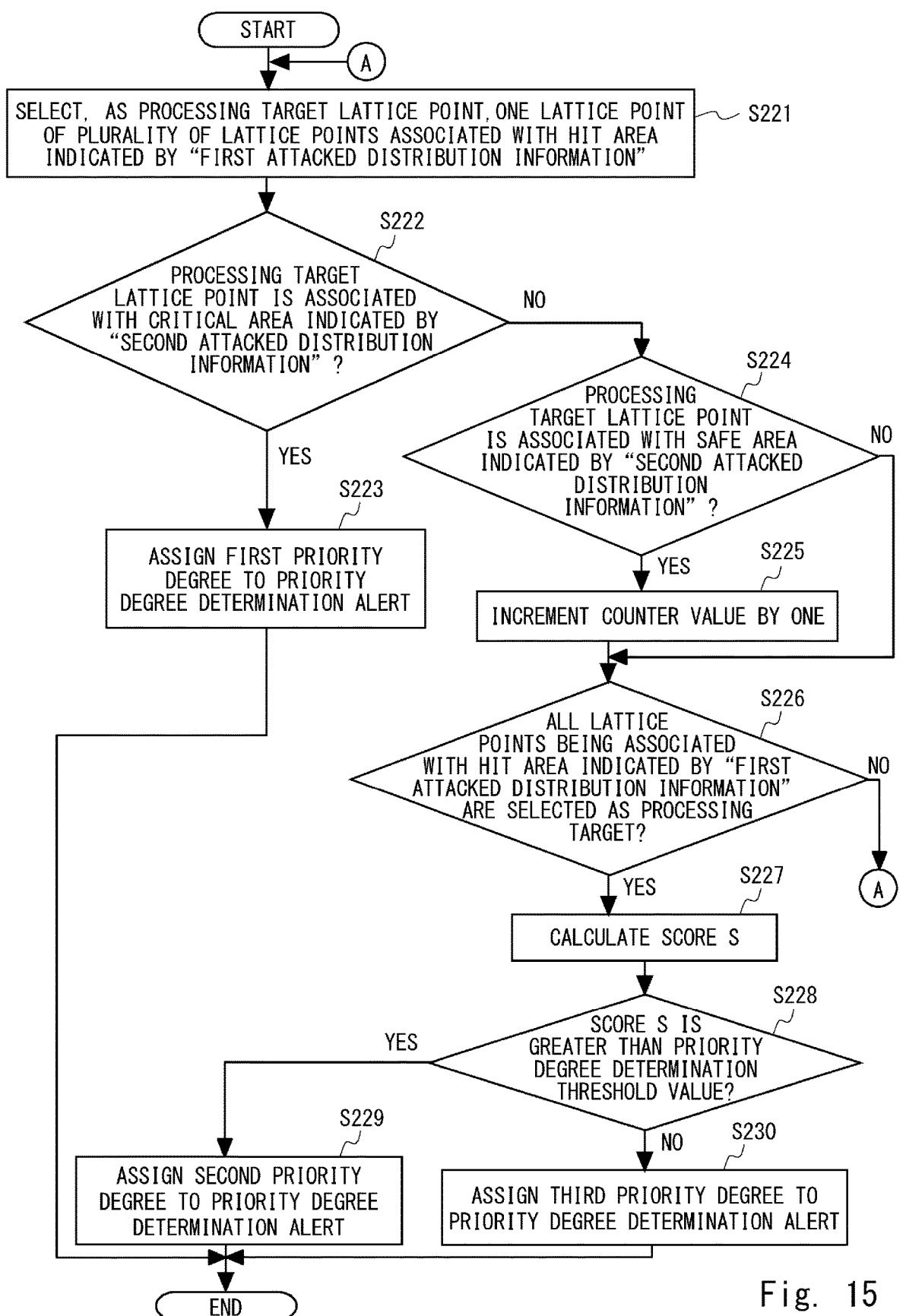
FIG. 15 is a flowchart illustrating one example of a processing operation of the processing device according to the third example embodiment.

One example of a processing operation of the processing device 50 having the configuration described above will be described. FIGS. 13 to 15 are flowcharts illustrating one example of the processing operation of the processing device according to the third example embodiment.

The acquisition unit 51 acquires a "related alert information unit group" from the alert information table 40A (step S201).

The acquisition unit 51 acquires a "related traffic information unit group" from the traffic information table 40B (step S202).

The distribution formation unit 52 calculates a value of a first kind transmission performance index and a value of a second kind transmission performance index for each traffic information unit of the related traffic information unit group (step S203).

The distribution formation unit 52 performs formation processing of "second attacked distribution information" (step S204). FIG. 14 is a flowchart illustrating one example of the formation processing of second attacked distribution information.

The distribution formation unit 52 calculates a "confirmed attack probability density", based on the value of the first kind transmission performance index and the value of the second kind transmission performance index being calculated in step S203 (step S211).

The distribution formation unit 52 selects one lattice point (i.e., unit area) being a processing target (step S212).

The distribution formation unit 52 determines whether a value of the confirmed attack probability density associated with the processing target lattice point is greater than an area determination threshold value Th$_{area}$ (step S213).

When the value of the confirmed attack probability density associated with the processing target lattice point is greater than the area determination threshold value Th$_{area}$ (step S213: YES), the distribution formation unit 52 assigns an area label "hit area" to the processing target lattice point (step S214).

The distribution formation unit 52 determines whether all lattice points are selected as the processing target (step S215). When all the lattice points are selected as the processing target (step S215: YES), the "formation processing of second attacked distribution information" ends.

When a lattice point that is not yet selected as the processing target is present (step S215: NO), the distribution formation unit 52 selects, as the processing target lattice point, the lattice point that is not yet selected (step S212).

When the value of the confirmed attack probability density associated with the processing target lattice point is equal to or less than the area determination threshold value Th$_{area}$ (step S213: NO), the processing step proceeds to step S215.

Returning to the description in FIG. 13, the priority degree determination unit 53 acquires "first attacked distribution information" from the area table 21C (step S205). As described above, the priority degree determination unit 53 acquires the "first attacked distribution information" associated with the same combination as a combination of a signature ID, a destination IP address, and a destination port number of a priority degree determination alert.

The priority degree determination unit 53 performs determination processing of a priority degree of a priority degree determination alert (step S206). FIG. 15 is a flowchart illustrating one example of the determination processing of a priority degree of a priority degree determination alert.

The priority degree determination unit 53 selects, as a processing target lattice point, one lattice point of a plurality of lattice points (unit areas) associated with a hit area indicated by the "first attacked distribution information" (step S221).

The priority degree determination unit 53 determines whether the processing target lattice point is associated with a critical area indicated by the "second attacked distribution information" (step S222).

When the processing target lattice point is associated with the critical area indicated by the "second attacked distribution information" (step S222: YES), the priority degree determination unit 53 assigns a first priority degree to the priority degree determination alert (step S223). Then, the priority degree determination processing ends.

When the processing target lattice point is not associated with the critical area indicated by the "second attacked distribution information" (step S222: NO), the priority degree determination unit 53 determines whether the processing target lattice point is associated with a safe area indicated by the "second attacked distribution information" (step S224).

When the processing target lattice point is associated with the safe area indicated by the "second attacked distribution information" (step S224: YES), the priority degree determination unit 53 increments a counter value by one (step S225). An initial value of the counter value is zero.

When the processing target lattice point is not associated with the safe area indicated by the "second attacked distribution information" (step S224: NO), the processing step proceeds to step S226.

The priority degree determination unit 53 determines whether all lattice points being associated with the hit area indicated by the "first attacked distribution information" are selected as the processing target (step S226).

When a lattice point that is not yet selected as the processing target is present (step S226: NO), the priority degree determination unit 53 selects, as the processing target lattice point, the lattice point that is not yet selected (step S221).

When all the lattice points are selected as the processing target (step S226: YES), the priority degree determination unit 53 calculates a score S by using the equation (3) described above. The counter value being counted in step S225 is used as N$_{safe}$ in the equation (3).

The priority degree determination unit 53 determines whether the score S is greater than a priority degree determination threshold value (step S228).

When the score S is greater than the priority degree determination threshold value (step S228: YES), the priority degree determination unit 53 assigns a "second priority degree" to the priority degree determination alert (step S229).

When the score S is equal to or less than the priority degree determination threshold value (step S228: NO), the priority degree determination unit 53 assigns a "third priority degree" to the priority degree determination alert (step S230). Then, the priority degree determination processing ends.

Fourth Example Embodiment

A fourth example embodiment relates to display control of a priority degree of a priority degree determination alert, and information about a "related traffic information unit group" related to the priority degree determination alert, and the like. Note that a basic configuration of a system according to the fourth example embodiment is the same as that of the system 1 according to the third example embodiment. In other words, the processing device 50 in the system 1 may be replaced with a processing device 60 according to the fourth example embodiment.

Figure 16:
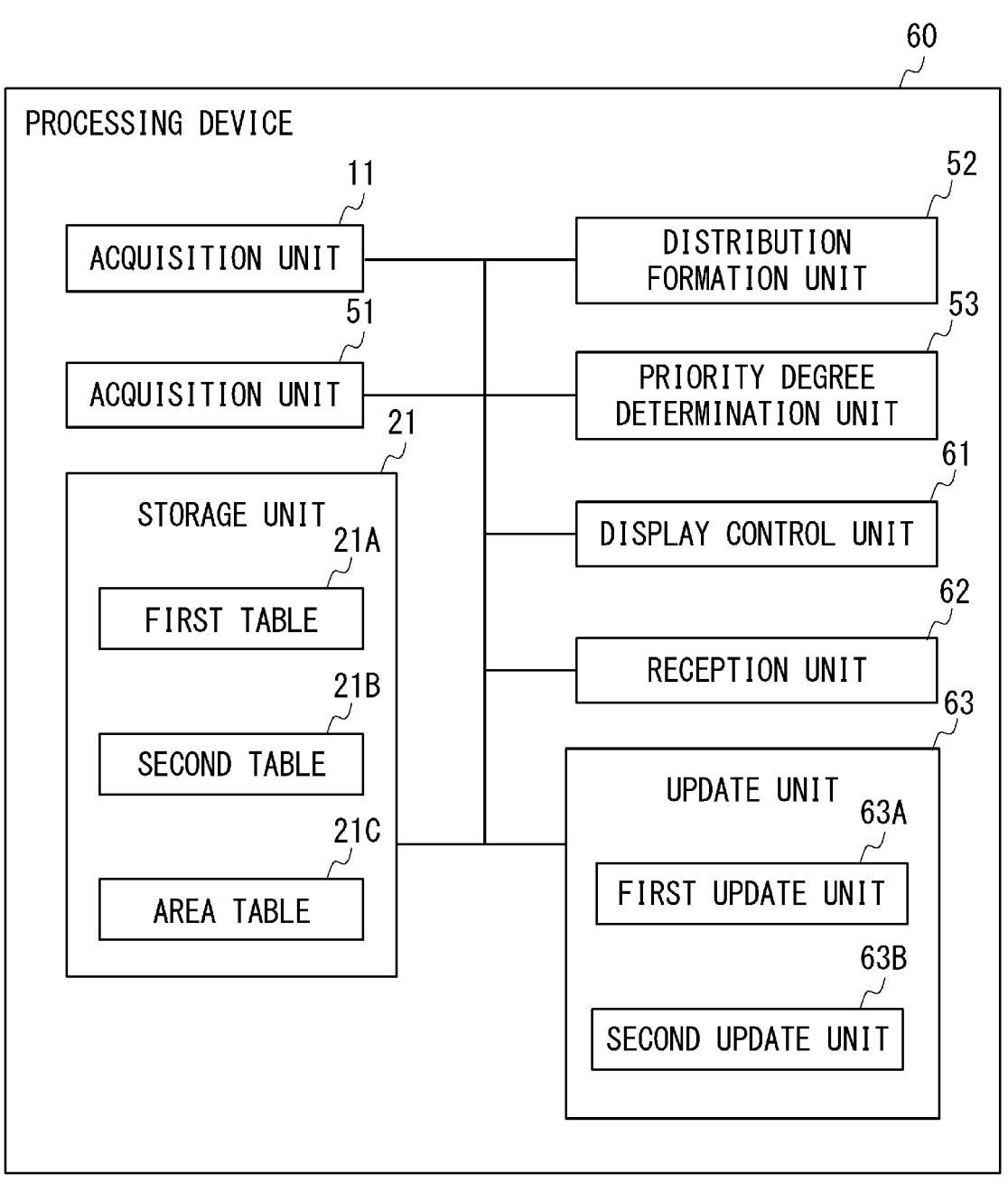
FIG. 16 is a block diagram illustrating one example of a processing device according to a fourth example embodiment.

FIG. 16 is a block diagram illustrating one example of the processing device according to the fourth example embodiment. The processing device 60 illustrated in FIG. 16 is connected to a display device (not illustrated). In FIG. 16, the processing device 60 includes an acquisition unit 11, a storage unit 21, an acquisition unit 51, a distribution formation unit 52, a priority degree determination unit 53, a display control unit 61, a reception unit 62, and an update unit 63. The update unit 63 includes a first update unit 63A and a second update unit 63B.

The display control unit 61 displays, on the display device (not illustrated), a priority degree of a priority degree determination alert being determined by the priority degree determination unit 53, and each traffic information unit included in a "related traffic information unit group". The display control unit 61 may further display each alert information unit included in a "related alert information unit group" on the display device (not illustrated). The display control unit 61 may further display, on the display device (not illustrated), a check box being associated with each traffic information unit displayed on the display device (not illustrated). For example, by checking the check box by an analyzer, information indicating success of an attack by a traffic flow associated with the traffic information unit associated with the check box can be input. Further, by not checking the check box by an analyzer, information indicating failure of an attack by a traffic flow associated with the traffic information unit associated with the check box can be input. FIG. 17 is a diagram illustrating one example of the display.

The reception unit 62 receives input information by an analyzer. In other words, the reception unit 62 receives a feedback signal indicating success or failure of an attack by each of a plurality of traffic flows being associated with a plurality of traffic information units displayed on the display device (not illustrated).

The first update unit 63A updates a second table 21B by using a value of a first kind transmission performance index and a value of a second kind transmission performance index of a traffic flow (traffic information unit) indicating success of an attack by the feedback signal. Further, the first update unit 63A updates a first table 21A by using a value of the first kind transmission performance index and a value of the second kind transmission performance index of a traffic flow (traffic information unit) indicating failure of an attack by the feedback signal.

The second update unit 63B forms new "first attacked distribution information" by the same method as the formation method of "first attacked distribution information" described in the second example embodiment by using the updated first table 21A and the updated second table 21B. Then, the second update unit 63B updates an area table 21C by the new "first attacked distribution information".

Fifth Example Embodiment

A fifth example embodiment relates to display control of the "first attacked distribution information" described in the first example embodiment and the second example embodiment.

FIG. 18 is a block diagram illustrating one example of a processing device according to the fifth example embodiment. In FIG. 18, a processing device 70 includes an acquisition unit 11, a storage unit 21, a distribution formation unit 22, and a display control unit 71.

Figure 19:
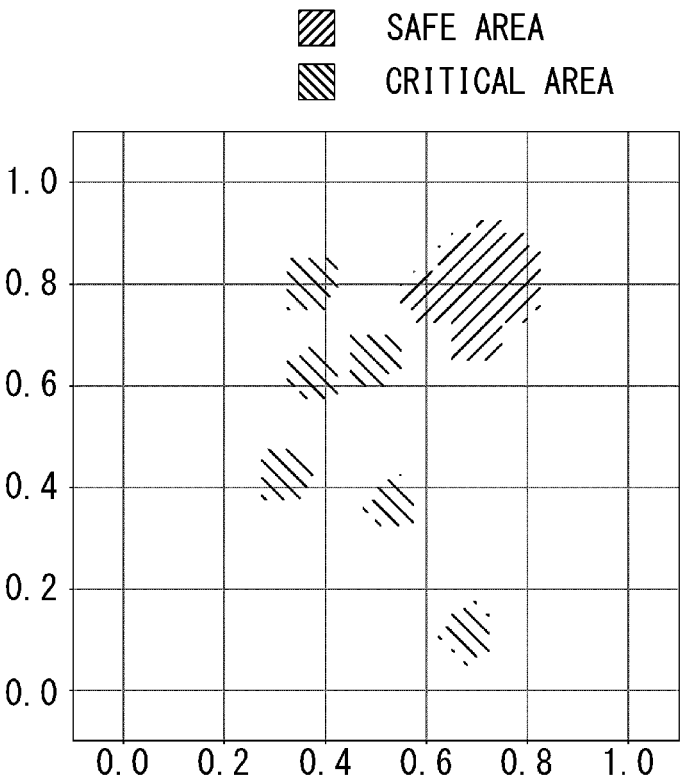
FIG. 19 is a diagram illustrating one example of a display manner according to the fifth example embodiment.

The display control unit 71 displays the coordinate plane described above on a display device (not illustrated), and also displays a plurality of areas in manners different from each other in the displayed coordinate plane on the display device (not illustrated). FIG. 19 is a diagram illustrating one example of the display manner according to the fifth example embodiment.

For example, the display control unit 71 may display each of a failed attack area (safe area), a successful attack area (critical area), and an unconfirmed attack area (unknown area) in a different color. For example, the failed attack area (safe area) may be displayed in blue, the successful attack area (critical area) may be displayed in red, and the unconfirmed attack area (unknown area) may be displayed without color.

With the configuration of the processing device 70 described above, useful information for analyzing a tendency of success or failure of an attack can be displayed in a manner easy for an analyzer to understand.

Sixth Example Embodiment

A sixth example embodiment relates to display control of the "first attacked distribution information" and the "second attacked distribution information" described in the fourth example embodiment, and the like.

Figure 20:
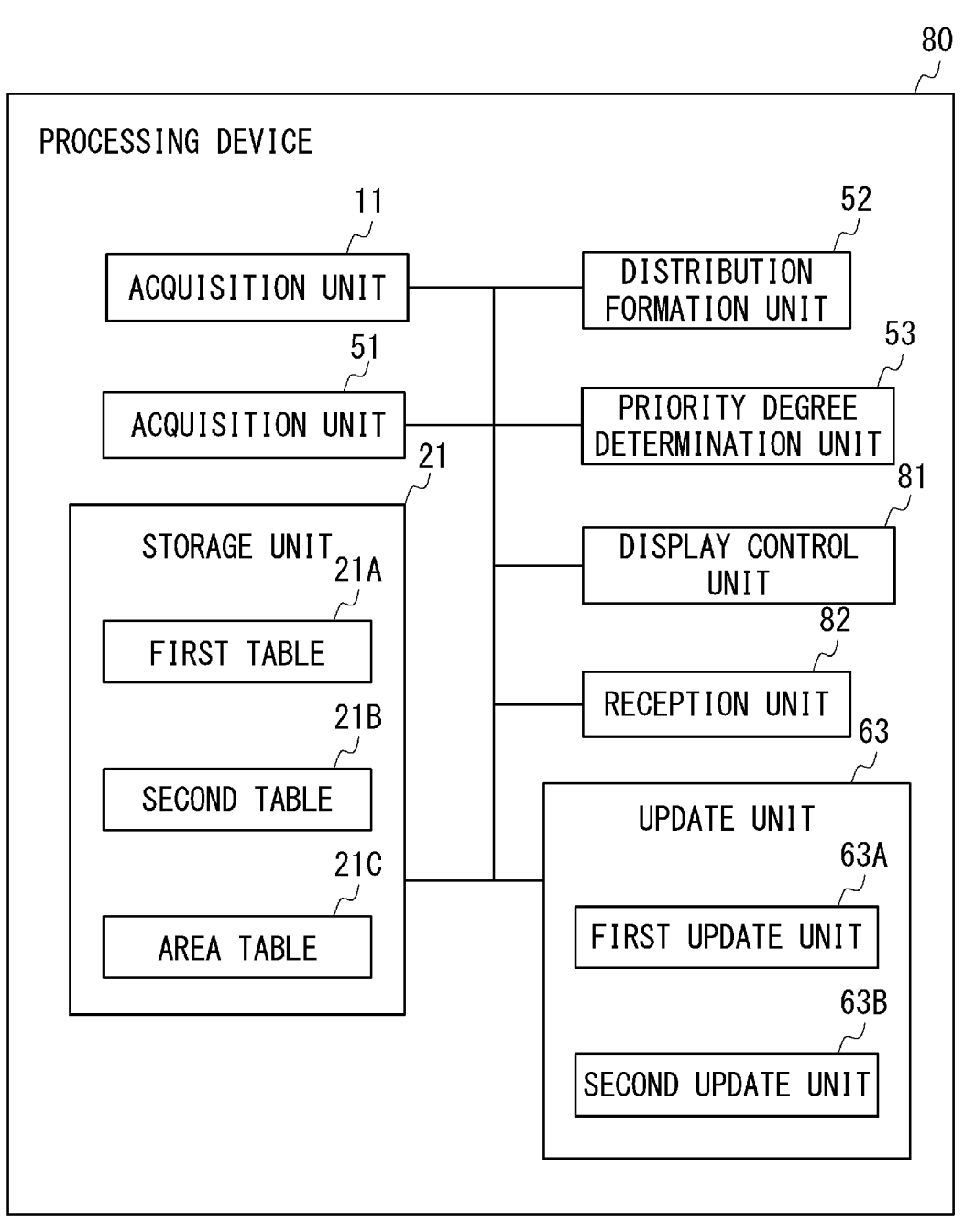
FIG. 20 is a block diagram illustrating one example of a processing device according to a sixth example embodiment.

FIG. 20 is a block diagram illustrating one example of a processing device according to the sixth example embodiment. In FIG. 20, a processing device 80 includes an acquisition unit 11, a storage unit 21, an acquisition unit 51, a distribution formation unit 52, a priority degree determination unit 53, an update unit 63, a display control unit 81, and a reception unit 82.

Figure 21:
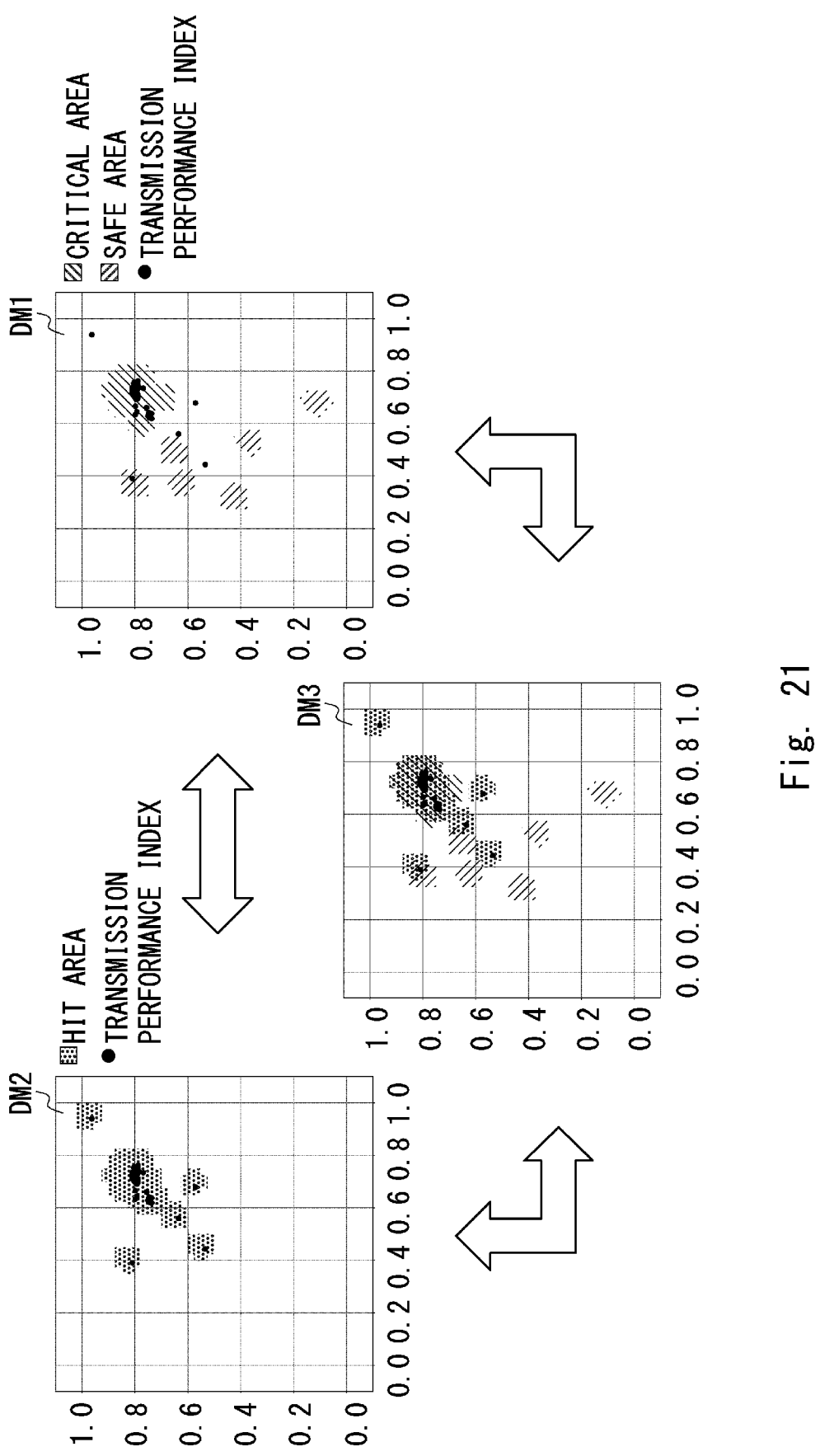
FIG. 21 is a diagram for describing switching of a display manner.

The display control unit 81 performs control for switching a display manner being displayed on a display device (not illustrated) among a first display manner (DM1), a second display manner (DM2), and a third display manner (DM3). FIG. 21 is a diagram for describing switching of the display manner.

As illustrated in FIG. 21, in the first display manner (DM1), the coordinate plane described above is displayed on the display device (not illustrated), and a failed attack area, a successful attack area, and an unconfirmed attack area are also displayed in manners different from one another in the displayed coordinate plane, based on "first attacked distribution information".

In the second display manner (DM2), the coordinate plane described above is displayed on the display device (not illustrated), and a confirmed attack area is also displayed in the displayed coordinate plane, based on "second attacked distribution information".

In the third display manner (DM3), the coordinate plane described above is displayed on the display device (not illustrated), and the failed attack area, the successful attack area, the unconfirmed attack area, and the confirmed attack area are also displayed in manners different from one another in the displayed coordinate plane, based on the "first attacked distribution information" and the "second attacked distribution information".

Figure 22:
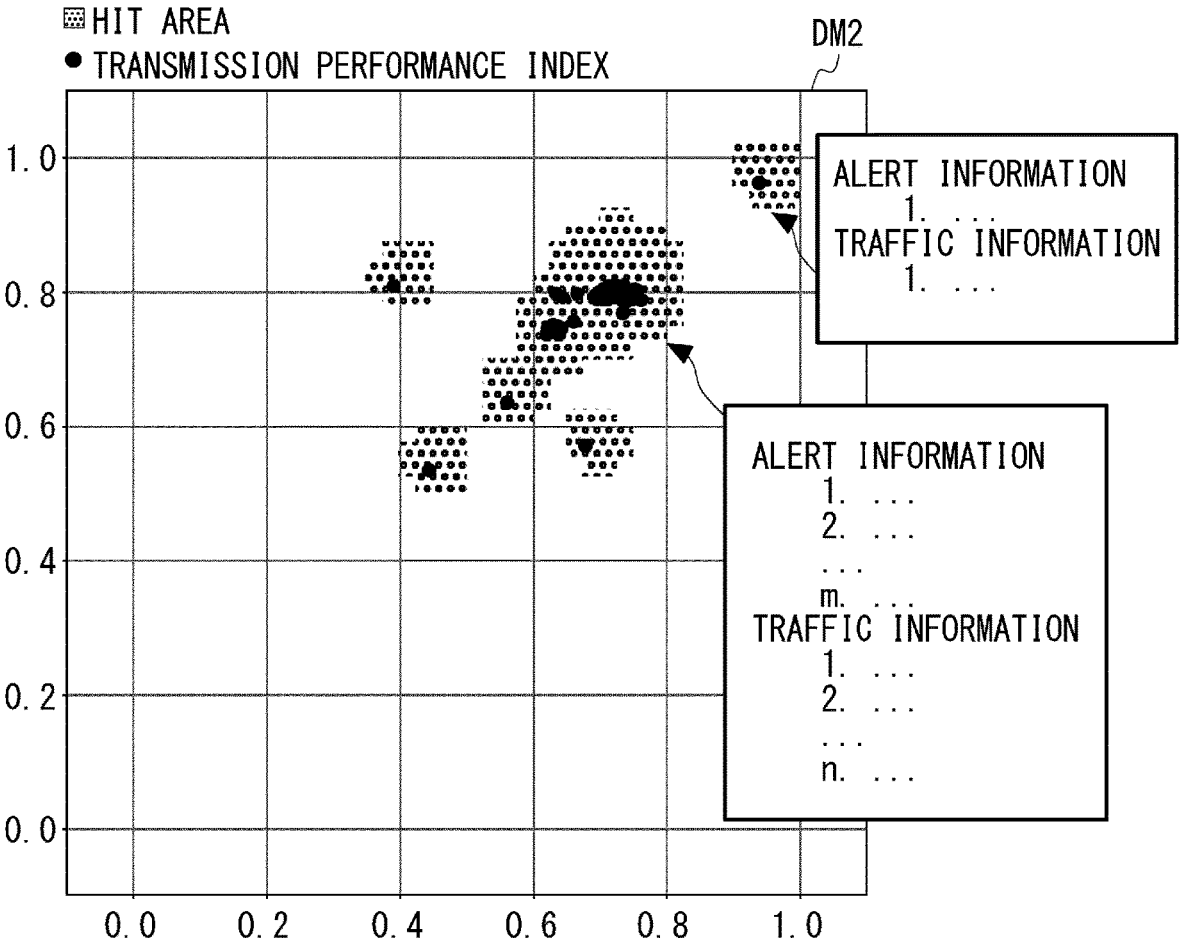
FIG. 22 is a diagram for describing a pop-up display.
Figure 23:
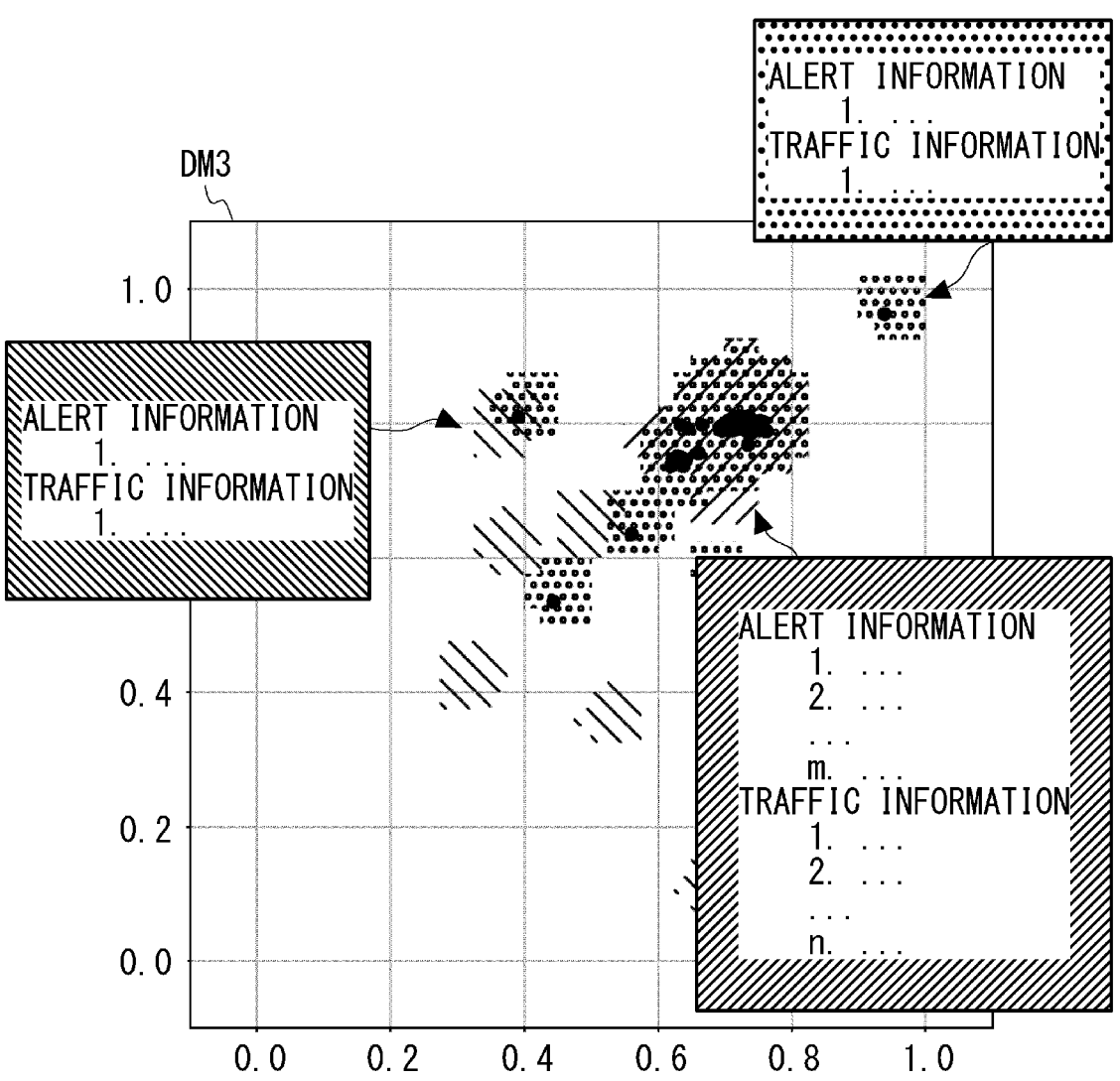
FIG. 23 is a diagram for describing a pop-up display.

Further, as illustrated in FIG. 22, the display control unit 81 may recognize a position of a cursor on the display device (not illustrated), and perform control in such a way that an alert information unit and a traffic information unit being associated with an area on which the cursor is located are displayed in a pop-up display. FIG. 22 is a diagram for describing the pop-up display. Further, as illustrated in FIG. 23, the display control unit 81 may perform a pop-up display in a different manner according to a classification of an area on which the cursor is located. FIG. 23 is a diagram for describing the pop-up display.

Figure 24:
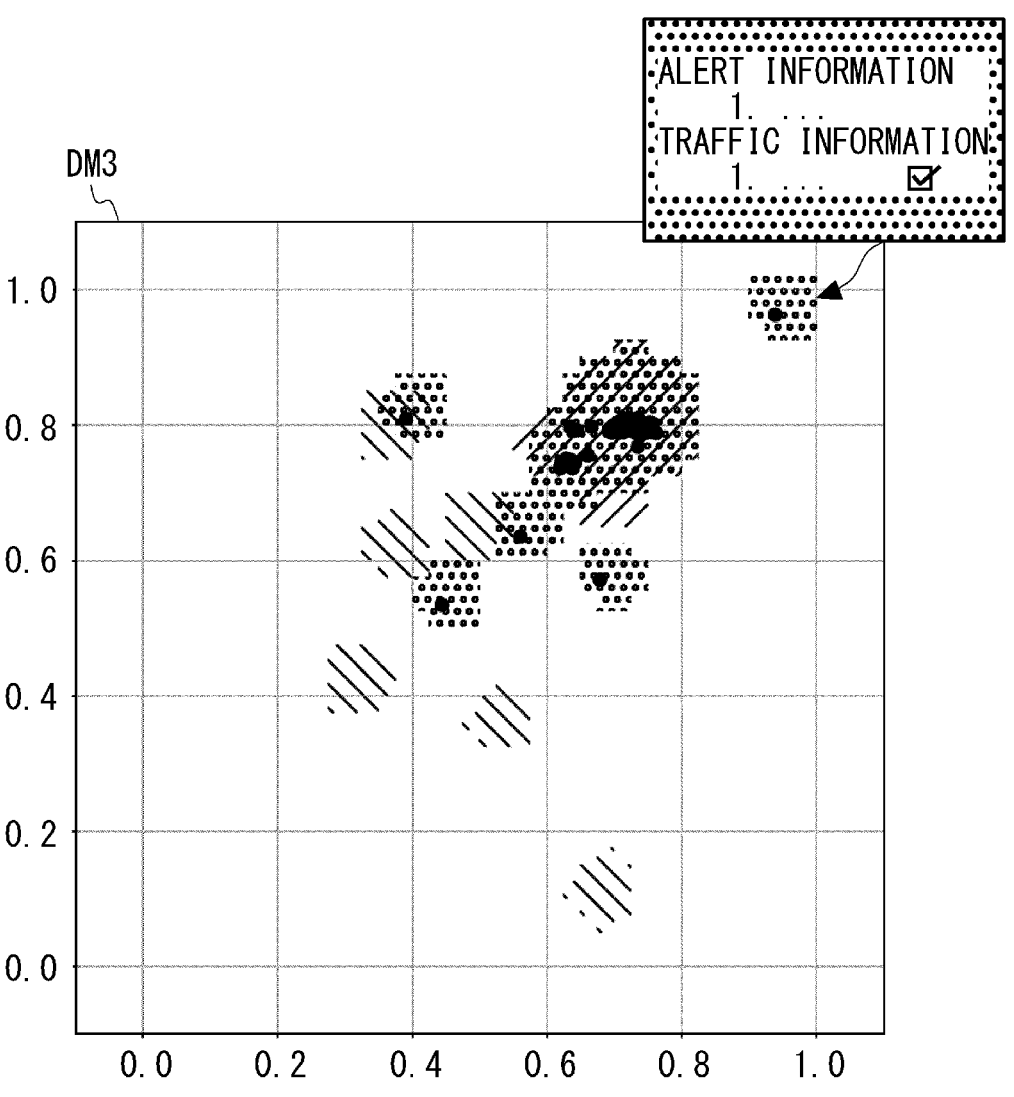
FIG. 24 is a diagram for describing a pop-up display.

Further, as illustrated in FIG. 24, the display control unit 81 may display a check box being associated with each traffic information unit displayed in a pop-up display. In this way, similarly to the fourth example embodiment, information indicating success of an attack by a traffic flow associated with a traffic information unit associated with the check box can be input. FIG. 24 is a diagram for describing the pop-up display.

Figure 25:
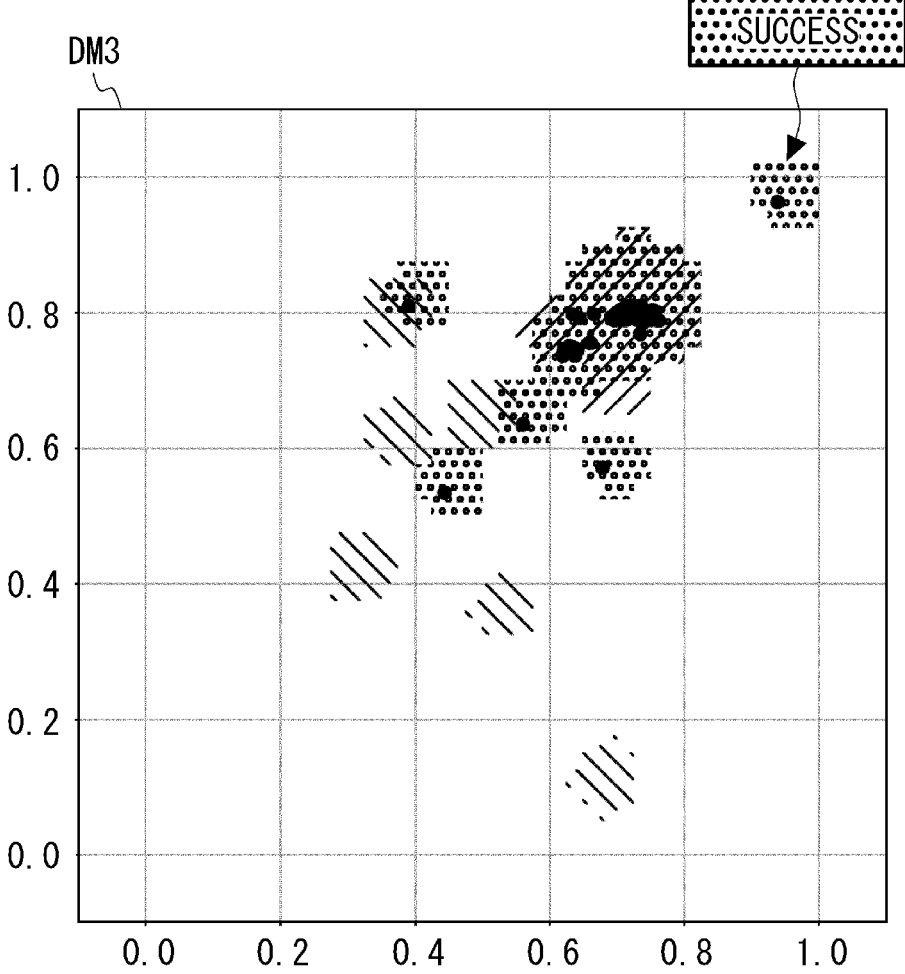
FIG. 25 is a diagram for describing a pop-up display.

Further, as illustrated in FIG. 25, the display control unit 81 may recognize a position of the cursor on the display device (not illustrated), and display a "success" selection button when the display control unit 81 detects a right click with the cursor located on an area. By clicking the "success" selection button by an analyzer, information indicating success of an attack by a traffic flow associated with all traffic information units associated with the area can be input. FIG. 25 is a diagram for describing the pop-up display.

The reception unit 82 receives input information by an analyzer. In other words, the reception unit 82 receives a feedback signal indicating success or failure of an attack by each of a plurality of traffic flows being associated with a plurality of traffic information units displayed on the display device (not illustrated).

Seventh Example Embodiment

A seventh example embodiment relates to a variation of a priority degree determination. Note that a basic configuration of a system according to the seventh example embodiment is the same as that of the system 1 according to the third example embodiment. In other words, the processing device 50 in the system 1 may be replaced with a processing device 90 according to the seventh example embodiment.

Figure 26:
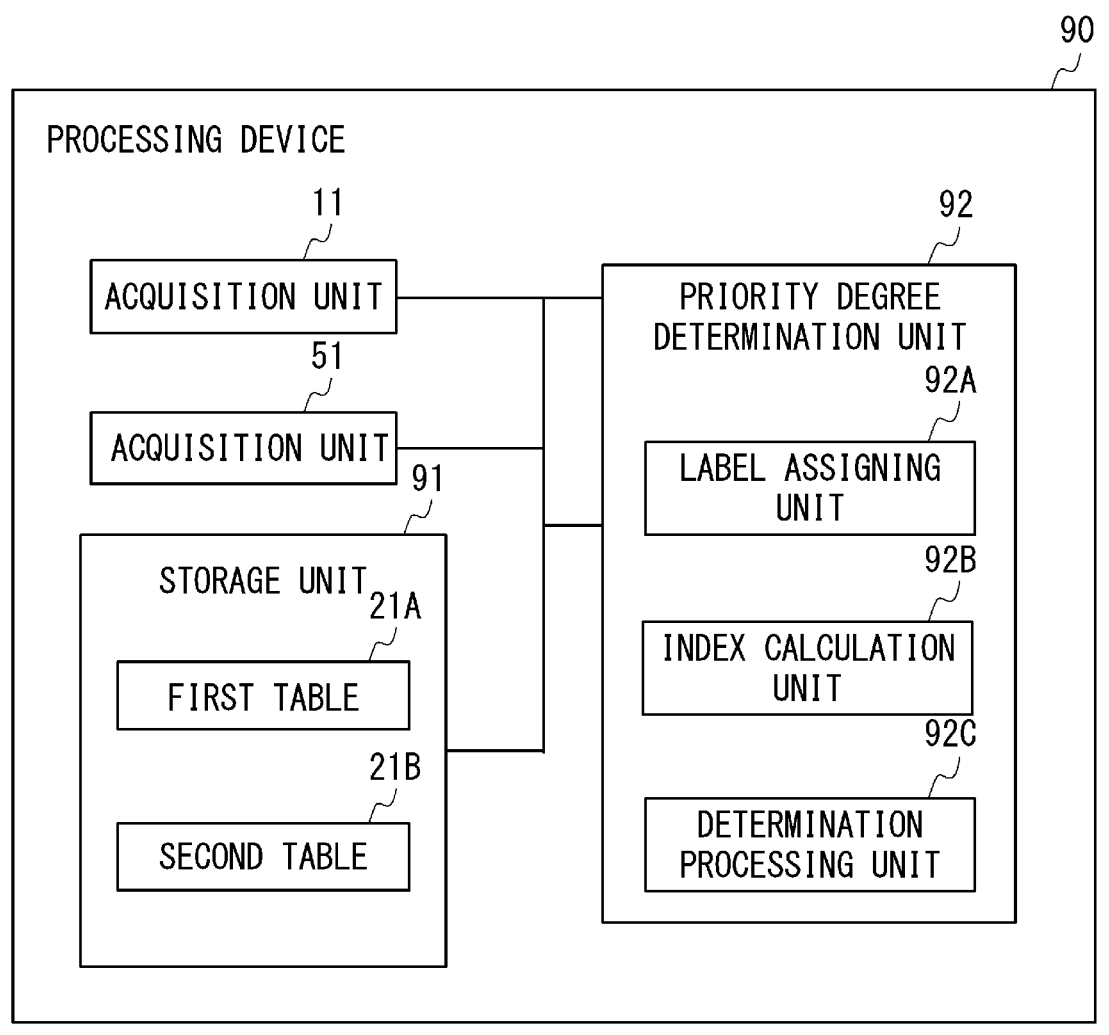
FIG. 26 is a block diagram illustrating one example of a processing device according to a seventh example embodiment.

FIG. 26 is a block diagram illustrating one example of the processing device according to the seventh example embodiment. In FIG. 26, the processing device 90 includes an acquisition unit 11, an acquisition unit 51, a storage unit 91, and a priority degree determination unit 92. The storage unit 91 stores a first table 21A and a second table 21B.

The priority degree determination unit 92 includes a label assigning unit 92A, an index calculation unit 92B, and a determination processing unit 92C.

The label assigning unit 92A provides a label "failed attack (safe)" to each entry (hereinafter, may be referred to as a "failed attack entry") being acquired from the first table 21A by the acquisition unit 11. Further, the label assigning unit 92A provides a label "successful attack (critical)" to each entry (hereinafter, may be referred to as a "successful attack entry") being acquired from the second table 21B by the acquisition unit 11. Herein, a combination of a signature ID, a destination IP address, and a destination port number for each failed attack entry being acquired from the first table 21A by the acquisition unit 11 and each successful attack entry being acquired from the second table 21B by the acquisition unit 11 is the same as a combination for a "priority degree determination alert".

Similarly to the index calculation unit 52A according to the third example embodiment, the index calculation unit 92B calculates a value of a first kind transmission performance index and a value of a second kind transmission performance index for each traffic information unit of a related traffic information unit group.

The determination processing unit 92C successively selects each traffic information unit of the related traffic information unit group as a "determination processing target unit", and performs the following processing on the determination processing target unit.

In other words, the determination processing unit 92C counts the number of points ("successful attack points") that are present within a predetermined distance (threshold value $Th_{dist}$) from points (hereinafter, may be referred to as "determination target points") in the coordinate plane described above being associated with a value of the first kind transmission performance index and a value of the second kind transmission performance index of the determination processing target unit and are associated with a successful attack entry, and the number of points ("failed attack points") that are present within the predetermined distance and are associated with a failed attack entry. The distance described above is, for example, a Euclidean distance. Then, when the number of the successful attack points is equal to or more than the number of the failed attack points, the determination processing unit 92C assigns a label "critical" to the determination processing target unit. Further, when the number of the successful attack points is smaller than the number of the failed attack points, the determination processing unit 92C assigns a label "safe" to the determination processing target unit. Further, when both of the number of the successful attack points and the number of the failed attack points are zero, the determination processing unit 92C assigns a label "unknown" to the determination processing target unit.

Then, when even one traffic information unit being assigned with "critical" is present among the traffic information units of the related traffic information unit group, the determination processing unit 92C assigns the "first priority degree" described above to a "priority degree determination alert".

Further, when a traffic information unit being assigned with "critical" is not present among the traffic information units of the related traffic information unit group, the determination processing unit 92C calculates a score S by using the following equation (4).

[Mathematical 4]

$$S = \frac{N_{unk}}{N_{safe} + N_{unk}} \qquad (4)$$

In the equation (4), $N_{safe}$ is the number of the traffic information units being assigned with the label "safe" in the related traffic information unit group, and $N_{unk}$ is the number of the traffic information units being assigned with the label "unknown" in the related traffic information unit group.

Then, when the calculated score S is greater than a priority degree determination threshold value, the determination processing unit 92C assigns the "second priority degree" described above to the "priority degree determination alert". Further, when the calculated score S is equal to or less than the priority degree determination threshold value, the determination processing unit 92C assigns the "third priority degree" described above to the "priority degree determination alert".

Other Example Embodiment

Figure 27:
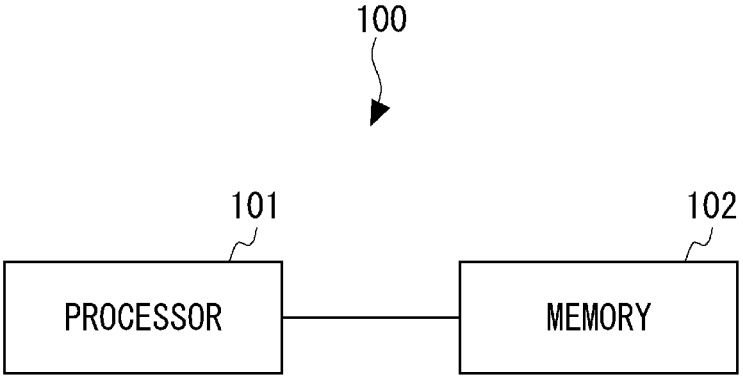
FIG. 27 is a diagram illustrating a hardware configuration example of a processing device.

FIG. 27 is a diagram illustrating a hardware configuration example of a processing device. In FIG. 27, a processing device 100 includes a processor 101 and a memory 102. The processor 101 may be, for example, a microprocessor, a micro processing unit (MPU), or a central processing unit (CPU). The processor 101 may also include a plurality of processors. The memory 102 is formed of a combination of a volatile memory and a non-volatile memory. The memory 102 may include a storage disposed away from the processor 101. In this case, the processor 101 may access the memory 102 via an I/O interface that is not illustrated.

The processing devices 10, 20, 50, 60, 70, 80, and 90 according to the first example embodiment to the seventh example embodiment can each include the hardware configuration illustrated in FIG. 27. The acquisition units 11 and 51, the distribution formation units 12, 22, and 52, the priority degree determination units 53 and 92, the display control units 61, 71, and 81, the reception units 62 and 82, and the update unit 63 of the processing devices 10, 20, 50, 60, 70, 80, and 90 according to the first example embodiment to the seventh example embodiment may be achieved by reading and executing a program stored in the memory 102 by the processor 101. The storage units 21 and 91 may be achieved by the memory 102. The program may be stored by using various types of non-transitory computer-readable mediums, and may be supplied to the processing devices 10, 20, 50, 60, 70, 80, and 90. Examples of the non-transitory computer-readable medium include a magnetic recording medium (for example, a flexible disk, a magnetic tape, a hard disk drive), and a magneto-optical recording medium (for example, a magneto-optical disk). Moreover, examples of the non-transitory computer-readable medium include a CD-ROM (read only memory), a CD-R, and a CD-R/W. Moreover, examples of the non-transitory computer-readable medium include a semiconductor memory. The semiconductor memory includes, for example, a mask ROM, a programmable ROM (PROM), an erasable PROM (EPROM), a flash ROM, a random access memory (RAM). Further, the program may be supplied to the processing devices 10, 20, 50, 60, 70, 80, and 90 by various types of transitory computer-readable mediums. Examples of the transitory computer-readable medium include an electrical signal, an optical signal, and an electromagnetic wave. The transitory computer-readable medium may supply the program to the processing devices 10, 20, 50, 60, 70, 80, and 90 via a wired communication path such as an electric wire and an optical fiber or a wireless communication path.

Although the invention of the present application has been described with reference to the example embodiments, the invention of the present application is not limited to the above-described example embodiments. Various modifications that can be understood by those skilled in the art can be made to the configuration and the details of the invention of the present application within the scope of the invention.

A part or the whole of the above-described example embodiments may also be described as in supplementary notes below, which is not limited thereto.

Supplementary Note 1

A processing device including:

a first acquisition means for acquiring a value of a first kind transmission performance index and a value of a second kind transmission performance index of each of a plurality of failed attack traffics being associated with a failed attack on an apparatus in a network, and a value of the first kind transmission performance index and a value of the second kind transmission performance index of each of a plurality of successful attack traffics being associated with a successful attack; and a distribution formation means for forming first attacked distribution information including information about a plurality of areas including a failed attack area and a successful attack area in a coordinate plane with the first kind transmission performance index and the second kind transmission performance index as two coordinate axes, based on a value of the first kind transmission performance index and a value of the second kind transmission performance index of the plurality of failed attack traffics, and a value of the first kind transmission performance index and a value of the second kind transmission performance index of the plurality of successful attack traffics.

Supplementary Note 2

The processing device according to Supplementary Note 1, wherein the distribution formation means includes a probability density distribution calculation means for calculating a distribution of a failed attack probability density in the coordinate plane for the failed attack traffic, based on a value of the first kind transmission performance index and a value of the second kind transmission performance index of the plurality of failed attack traffics, and also calculating a distribution of a successful attack probability density in the coordinate plane for the successful attack traffic, based on a value of the first kind transmission performance index and a value of the second kind transmission performance index of the plurality of successful attack traffics, and an area identification means for assigning each unit area in the coordinate plane to any of a failed attack area, a successful attack area, and an unconfirmed attack area, based on magnitude between each of the failed attack probability density and the successful attack probability density of each unit area and an area determination threshold value, and forming the first attacked distribution information by associating each unit area with an area classification being assigned to each unit area.

Supplementary Note 3

The processing device according to Supplementary Note 2, further including a second acquisition means for acquiring transmission performance of a plurality of first traffic flows related to a first security alert being notified from a network-based intrusion detection device configured to detect an attack on an apparatus in the network, wherein the first attacked distribution information is related to a second security alert being notified from the network-based intrusion detection device, and the distribution formation means calculates a value of the first kind transmission performance index and a value of the second kind transmission performance index of each first traffic flow, based on the acquired transmission performance of the plurality of first traffic flows, and forms second attacked distribution information including information about a confirmed attack area related to the first security alert in the coordinate plane, based on a calculated value of the first kind transmission performance index and a calculated value of the second kind transmission performance index of each first traffic flow, the processing device further including a priority degree determination means for determining a priority degree of the first security alert, based on the first attacked distribution information and the second attacked distribution information.

Supplementary Note 4

The processing device according to Supplementary Note 3, wherein the priority degree determination means assigns a first priority degree to the first security alert when at least a part of the confirmed attack area indicated by the second attacked distribution information overlaps the successful attack area indicated by the first attacked distribution information, calculates a proportion of a portion area of the confirmed attack area that does not overlap the failed attack area when the confirmed attack area indicated by the second attacked distribution information and the successful attack area indicated by the first attacked distribution information do not overlap each other, assigns a second priority degree to the first security alert when the calculated proportion is greater than a priority degree determination threshold value, and assigns a third priority degree to the first security alert when the calculated proportion is equal to or less than a priority degree determination threshold value, the first priority degree has a priority degree equal to the second priority degree or higher than the second priority degree, and the third priority degree has a priority degree lower than both of the first priority degree and the second priority degree.

Supplementary Note 5

The processing device according to Supplementary Note 3 or 4 including:

a display control means for displaying, on a display means, a priority degree of the first security alert, and information about the plurality of first traffic flows related to the first security alert; and a reception means for receiving a feedback signal indicating success or failure of an attack by each of the plurality of displayed first traffic flows.

Supplementary Note 6

The processing device according to Supplementary Note 5, wherein a first table configured to hold a value of the first kind transmission performance index and a value of the second kind transmission performance index of the plurality of failed attack traffics and a second table configured to hold a value of the first kind transmission performance index and a value of the second kind transmission performance index of the plurality of successful attack traffics are stored in a storage means, the processing device further including a first update means for updating the second table by using a value of the first kind transmission performance index and a value of the second kind transmission performance index of a first traffic flow indicating success of an attack by the feedback signal, and also updating the first table by using a value of the first kind transmission performance index and a value of the second kind transmission performance index of a first traffic flow indicating failure of an attack by the feedback signal.

Supplementary Note 7

The processing device according to Supplementary Note 6, wherein the distribution formation means stores the formed first attacked distribution information in the storage means by outputting the first attacked distribution information to the storage means, the processing device further including a second update means for updating the stored first attacked distribution information, based on the updated first table and the updated second table.

Supplementary Note 8

The processing device according to Supplementary Note 1, further including a display control means for displaying the plurality of areas in the coordinate plane in manners different from one another on a display means.

Supplementary Note 9

The processing device according to Supplementary Note 2, further including a second acquisition means for acquiring transmission performance of a plurality of first traffic flows related to a first security alert being notified from a network-based intrusion detection device configured to detect an attack on an apparatus in the network, wherein the first attacked distribution information is related to a second security alert being notified from the network-based intrusion detection device, and the distribution formation means calculates a value of the first kind transmission performance index and a value of the second kind transmission performance index of each first traffic flow, based on the acquired transmission performance of the plurality of first traffic flows, and forms second attacked distribution information including information about a confirmed attack area related to the first security alert in the coordinate plane, based on a calculated value of the first kind transmission performance index and a calculated value of the second kind transmission performance index of each first traffic flow, the processing device further including a display control means for controlling a display manner by a display means among a first display manner in which the failed attack area, the successful attack area, and the unconfirmed attack area are displayed in the coordinate plane by the display means in manners different from one another, a second display manner in which the confirmed attack area is displayed in the coordinate plane by the display means, and a third display manner in which the failed attack area, the successful attack area, the unconfirmed attack area, and the confirmed attack area are displayed in the coordinate plane by the display means.

Supplementary Note 10

A processing device including:

an acquisition means for acquiring transmission performance of a plurality of first traffic flows related to a first security alert being notified from a network-based intrusion detection device configured to detect an attack on an apparatus in a network;

a distribution formation means for calculating a value of a first kind transmission performance index and a value of a second kind transmission performance index of each first traffic flow, based on the acquired transmission performance of the plurality of first traffic flows, and forming second attacked distribution information including information about a confirmed attack area that is an area in a coordinate plane with the first kind transmission performance index and the second kind transmission performance index as two coordinate axes and is related to the first security alert, based on a calculated value of the first kind transmission performance index and a calculated value of the second kind transmission performance index of each first traffic flow; and a priority degree determination means for determining a priority degree of the first security alert, based on the second attacked distribution information, and first attacked distribution information including information about a plurality of areas including a failed attack area and a successful attack area in the coordinate plane.

Supplementary Note 11

A processing method including:

acquiring a value of a first kind transmission performance index and a value of a second kind transmission performance index of each of a plurality of failed attack traffics being associated with a failed attack on an apparatus in a network, and a value of the first kind transmission performance index and a value of the second kind transmission performance index of each of a plurality of successful attack traffics being associated with a successful attack; and forming first attacked distribution information including information about a plurality of areas including a failed attack area and a successful attack area in a coordinate plane with the first kind transmission performance index and the second kind transmission performance index as two coordinate axes, based on a value of the first kind transmission performance index and a value of the second kind transmission performance index of the plurality of failed attack traffics, and a value of the first kind transmission performance index and a value of the second kind transmission performance index of the plurality of successful attack traffics.

Supplementary Note 12

A non-transitory computer-readable medium configured to store a control program causing a processing device to execute processing of:

acquiring a value of a first kind transmission performance index and a value of a second kind transmission performance index of each of a plurality of failed attack traffics being associated with a failed attack on an apparatus in a network, and a value of the first kind transmission performance index and a value of the second kind transmission performance index of each of a plurality of successful attack traffics being associated with a successful attack; and forming first attacked distribution information including information about a plurality of areas including a failed attack area and a successful attack area in a coordinate plane with the first kind transmission performance index and the second kind transmission performance index as two coordinate axes, based on a value of the first kind transmission performance index and a value of the second kind transmission performance index of the plurality of failed attack traffics, and a value of the first kind transmission performance index and a value of the second kind transmission performance index of the plurality of successful attack traffics.

REFERENCE SIGNS LIST

1 SYSTEM
10 PROCESSING DEVICE
11 ACQUISITION UNIT (FIRST ACQUISITION UNIT)
12 DISTRIBUTION FORMATION UNIT
20 PROCESSING DEVICE
21 STORAGE UNIT
21A FIRST TABLE (DISTRIBUTION GENERATION RECORD TABLE)
21B SECOND TABLE (CRITICAL AREA GENERATION RECORD TABLE)
21C AREA TABLE
22 DISTRIBUTION FORMATION UNIT
22A PROBABILITY DENSITY DISTRIBUTION CALCULATION UNIT
22B AREA IDENTIFICATION UNIT
30 INTRUSION DETECTION SYSTEM (IDS)
40 STORAGE DEVICE
40A ALERT INFORMATION TABLE
40B TRAFFIC INFORMATION TABLE
50 PROCESSING DEVICE
51 ACQUISITION UNIT (SECOND ACQUISITION UNIT)
52 DISTRIBUTION FORMATION UNIT
52A INDEX CALCULATION UNIT
53 PRIORITY DEGREE DETERMINATION UNIT
60 PROCESSING DEVICE
61 DISPLAY CONTROL UNIT
62 RECEPTION UNIT
63 UPDATE UNIT
63A FIRST UPDATE UNIT
63B SECOND UPDATE UNIT
70 PROCESSING DEVICE
71 DISPLAY CONTROL UNIT
80 PROCESSING DEVICE
81 DISPLAY CONTROL UNIT
82 RECEPTION UNIT
90 PROCESSING DEVICE
91 STORAGE UNIT
92 PRIORITY DEGREE DETERMINATION UNIT
92A LABEL ASSIGNING UNIT
92B INDEX CALCULATION UNIT
92C DETERMINATION PROCESSING UNIT

What is claimed is:

1. A processing device comprising:
at least one memory storing instructions, and
at least one processor configured to execute, according to the instructions, a process comprising:
acquiring, for each of a plurality of failed attack traffics being associated with a failed attack on an apparatus in a network, a first value of a first kind transmission performance index and a first value of a second kind transmission performance index, and acquiring, for each of a plurality of successful attack traffics being associated with a successful attack, a second value of the first kind transmission performance index and a second value of the second kind transmission performance index;

forming first attacked distribution information including information about a plurality of areas including a failed attack area and a successful attack area in a coordinate plane with the first kind transmission performance index and the second kind transmission performance index as two coordinate axes, based on the first value of the first kind transmission performance index and the first value of the second kind transmission performance index for the plurality of failed attack traffics, and the second value of the first kind transmission performance index and the second value of the second kind transmission performance index for the plurality of successful attack traffics; and disconnecting the apparatus associated with the successful attack.

2. The processing device according to claim 1, wherein the forming includes:

calculating a distribution of a failed attack probability density in the coordinate plane for the failed attack traffic, based on the first value of the first kind transmission performance index and the first value of the second kind transmission performance index of the plurality of failed attack traffics, calculating a distribution of a successful attack probability density in the coordinate plane for the successful attack traffic, based on the second value of the first kind transmission performance index and the second value of the second kind transmission performance index of the plurality of successful attack traffics assigning each unit area in the coordinate plane to any of a failed attack area, a successful attack area, and an unconfirmed attack area, based on magnitude between each of the failed attack probability density and the successful attack probability density of each unit area and an area determination threshold value, and forming the first attacked distribution information by associating each unit area with an area classification being assigned to each unit area.

3. The processing device according to claim 2, wherein the process further comprises acquiring transmission performance of a plurality of first traffic flows related to a first security alert being notified from a network-based intrusion detection device configured to detect an attack on the apparatus in the network, the first attacked distribution information is related to a second security alert being notified from the network-based intrusion detection device, and the process further comprises:

calculating a third value of the first kind transmission performance index and a third value of the second kind transmission performance index of each first traffic flow, based on the acquired transmission performance of the plurality of first traffic flows, forming second attacked distribution information including information about a confirmed attack area related to the first security alert in the coordinate plane, based on a calculated value of the first kind transmission performance index and a calculated value of the second kind transmission performance index of each first traffic flow, and determining a priority degree of the first security alert, based on the first attacked distribution information and the second attacked distribution information.

4. The processing device according to claim 3, wherein the determining includes:

assigning a first priority degree to the first security alert when at least a part of the confirmed attack area indicated by the second attacked distribution information overlaps the successful attack area indicated by the first attacked distribution information, calculating a proportion of a portion area of the confirmed attack area that does not overlap the failed attack area when the confirmed attack area indicated by the second attacked distribution information and the successful attack area indicated by the first attacked distribution information do not overlap each other, assigning a second priority degree to the first security alert when the calculated proportion is greater than a priority degree determination threshold value, and assigning a third priority degree to the first security alert when the calculated proportion is equal to or less than a priority degree determination threshold value, the first priority degree has a priority degree equal to the second priority degree or higher than the second priority degree, and the third priority degree has a priority degree lower than both of the first priority degree and the second priority degree.

5. The processing device according to claim 3, wherein the process further comprising:

displaying, on display means, a priority degree of the first security alert, and information about the plurality of first traffic flows related to the first security alert; and receiving a feedback signal indicating success or failure of an attack by each of the plurality of displayed first traffic flows.

6. The processing device according to claim 5, wherein a first table configured to hold the first value of the first kind transmission performance index and the first value of the second kind transmission performance index for the plurality of failed attack traffics and a second table configured to hold the second value of the first kind transmission performance index and the second value of the second kind transmission performance index for the plurality of successful attack traffics are stored in storage means, and the process further comprises:

updating the second table by using a fourth value of the first kind transmission performance index and a fourth value of the second kind transmission performance index of a first traffic flow indicating success of an attack by the feedback signal, and updating the first table by using a fifth value of the first kind transmission performance index and a fifth value of the second kind transmission performance index of a first traffic flow indicating failure of an attack by the feedback signal.

7. The processing device according to claim 6, wherein the process further comprises:

storing the formed first attacked distribution information in the storage-means, and updating the stored first attacked distribution information, based on the updated first table and the updated second table.

8. The processing device according to claim 2, wherein process further comprises acquiring transmission performance of a plurality of first traffic flows related to a first security alert being notified from a network-based intrusion detection device configured to detect an attack on the apparatus in the network, the first attacked distribution information is related to a second security alert being notified from the network-based intrusion detection device, the process further comprises:

calculating a third value of the first kind transmission performance index and a third value of the second kind transmission performance index of each first traffic flow, based on the acquired transmission performance of the plurality of first traffic flows, forming second attacked distribution information including information about a confirmed attack area related to the first security alert in the coordinate plane, based on a calculated value of the first kind transmission performance index and a calculated value of the second kind transmission performance index of each first traffic flow, and controlling a display manner by display means among a first display manner in which the failed attack area, the successful attack area, and the unconfirmed attack area are displayed in the coordinate plane by the display means in manners different from one another, a second display manner in which the confirmed attack area is displayed in the coordinate plane by the display means, and a third display manner in which the failed attack area, the successful attack area, the unconfirmed attack area, and the confirmed attack area are displayed in the coordinate plane by the display means.

9. The processing device according to claim 1, wherein the process further comprises displaying the plurality of areas in the coordinate plane in manners different from one another on display means.

10. A processing device comprising:

at least one memory storing instructions, and at least one processor configured to execute, according to the instructions, a process comprising:

acquiring transmission performance of a plurality of first traffic flows related to a first security alert being notified from a network-based intrusion detection device configured to detect an attack on an apparatus in a network;

calculating a first value of a first kind transmission performance index and a first value of a second kind transmission performance index of each first traffic flow, based on the acquired transmission performance of the plurality of first traffic flows, forming second attacked distribution information including information about a confirmed attack area that is an area in a coordinate plane with the first kind transmission performance index and the second kind transmission performance index as two coordinate axes and is related to the first security alert, based on a calculated value of the first kind transmission performance index and a calculated value of the second kind transmission performance index of each first traffic flow;

determining a priority degree of the first security alert, based on the second attacked distribution information, and first attacked distribution information including information about a plurality of areas including a failed attack area and a successful attack area in the coordinate plane; and disconnecting the attacked apparatus.

11. A processing method comprising:

acquiring, for each of a plurality of failed attack traffics being associated with a failed attack on an apparatus in a network, a first value of a first kind transmission performance index and a first value of a second kind transmission performance index, and acquiring, for each of a plurality of successful attack traffics being associated with a successful attack, a second value of the first kind transmission performance index and a second value of the second kind transmission performance index;

forming first attacked distribution information including information about a plurality of areas including a failed attack area and a successful attack area in a coordinate plane with the first kind transmission performance index and the second kind transmission performance index as two coordinate axes, based on the first value of the first kind transmission performance index and the first value of the second kind transmission performance index for the plurality of failed attack traffics, and the second value of the first kind transmission performance index and the second value of the second kind transmission performance index for the plurality of successful attack traffics; and disconnecting the apparatus associated with the successful attack.

12. A non-transitory computer-readable medium configured to store a control program causing a processing device to execute processing of:

acquiring, for each of a plurality of failed attack traffics being associated with a failed attack on an apparatus in a network, a first value of a first kind transmission performance index and a first value of a second kind transmission performance index, and acquiring, for each of a plurality of successful attack traffics being associated with a successful attack, a second value of the first kind transmission performance index and a second value of the second kind transmission performance index;

forming first attacked distribution information including information about a plurality of areas including a failed attack area and a successful attack area in a coordinate plane with the first kind transmission performance index and the second kind transmission performance index as two coordinate axes, based on the first value of the first kind transmission performance index and the first value of the second kind transmission performance index for the plurality of failed attack traffics, and the second value of the first kind transmission performance index and the second value of the second kind transmission performance index for the plurality of successful attack traffics; and disconnecting the apparatus associated with the successful attack.

* * * * *